(12) United States Patent
Rimoni

(10) Patent No.: US 11,061,721 B2
(45) Date of Patent: *Jul. 13, 2021

(54) TASK QUEUES

(71) Applicant: Western Digital Technologies, Inc., San Jose, CA (US)

(72) Inventor: Yoram Rimoni, Haifa (IL)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/504,848

(22) Filed: Jul. 8, 2019

(65) Prior Publication Data
US 2019/0332428 A1 Oct. 31, 2019

Related U.S. Application Data

(63) Continuation of application No. 15/970,412, filed on May 3, 2018, now Pat. No. 10,379,903, which is a continuation of application No. 14/693,784, filed on Apr. 22, 2015, now Pat. No. 9,965,323.

(60) Provisional application No. 62/131,777, filed on Mar. 11, 2015.

(51) Int. Cl.
G06F 9/48 (2006.01)
G06F 9/50 (2006.01)
G06F 3/06 (2006.01)

(52) U.S. Cl.
CPC ............ *G06F 9/4881* (2013.01); *G06F 3/061* (2013.01); *G06F 3/0601* (2013.01); *G06F 3/0659* (2013.01); *G06F 3/0679* (2013.01); *G06F 3/0688* (2013.01); *G06F 9/5011* (2013.01); *G06F 9/5016* (2013.01);
(Continued)

(58) Field of Classification Search
CPC ....................... G06F 3/0601; G06F 2209/5021
USPC ......................................................... 718/103
See application file for complete search history.

(56) References Cited

U.S. PATENT DOCUMENTS 5,265,249 A * 11/1993 Kumamoto ......... G06F 11/3419
700/306
5,701,450 A 12/1997 Duncan
6,038,621 A 3/2000 Gale et al.
(Continued)

FOREIGN PATENT DOCUMENTS

EP 0 862 112 A2 9/1998

OTHER PUBLICATIONS

A. Sarkar, P. P. Chakrabarti and R. Kumar, "Frame-Based Proportional Round-Robin," in IEEE Transactions on Computers, vol. 55, No. 9, pp. 1121-1129, Sep. 2006, doi: 10.1109/TC.2006.148. (Year: 2006).*

(Continued)

*Primary Examiner* — Andrew M. Lyons
(74) *Attorney, Agent, or Firm* — Patterson & Sheridan, LLP; Steven H. Versteeg

(57) ABSTRACT

A data storage device may be configured to use multiple task queues to schedule tasks. The multiple task queues may be configured based on an architecture of the data storage device. In some implementations, the multiple task queues may be used to organize tasks received from an access device. In other implementations, the multiple task queues may be used to identify tasks, and identification of the tasks may be associated with an order of execution of the tasks.

20 Claims, 6 Drawing Sheets

(52) U.S. Cl.
CPC .......... *G06F 9/5038* (2013.01); *G06F 9/5044* (2013.01); *G06F 2209/5021* (2013.01)

(56) References Cited

U.S. PATENT DOCUMENTS

| | | | |
|---|---|---|---|
| 6,157,963 A | 12/2000 | Courtright, II et al. | |
| 6,179,489 B1 | 1/2001 | So et al. | |
| 6,298,370 B1 | 10/2001 | Tang et al. | |
| 6,393,534 B1* | 5/2002 | Chen .................. | G06F 13/1631 |
| | | | 711/158 |
| 6,438,135 B1 | 8/2002 | Tzeng | |
| 6,557,034 B1 | 4/2003 | Fujita et al. | |
| 6,591,304 B1 | 7/2003 | Sitaraman et al. | |
| 6,721,876 B1 | 4/2004 | Chen et al. | |
| 6,721,877 B1 | 4/2004 | Chen et al. | |
| 6,975,630 B1 | 12/2005 | Kusumoto | |
| 6,975,638 B1 | 12/2005 | Chen et al. | |
| 7,054,925 B2 | 5/2006 | Bauman et al. | |
| 7,158,964 B2 | 1/2007 | Wolrich et al. | |
| 7,234,139 B1 | 6/2007 | Feinberg | |
| 7,272,834 B2 | 9/2007 | Bauman et al. | |
| 7,324,536 B1 | 1/2008 | Holtey et al. | |
| 7,342,929 B2 | 3/2008 | Bremler-Barr et al. | |
| 7,657,706 B2 | 2/2010 | Iyer et al. | |
| 7,668,177 B1 | 2/2010 | Trapp et al. | |
| 7,822,814 B2 | 10/2010 | Bauman et al. | |
| 8,171,242 B2 | 5/2012 | Hong | |
| 8,208,406 B1 | 6/2012 | Jiang et al. | |
| 8,261,029 B1* | 9/2012 | Marshak .............. | G06F 3/0613 |
| | | | 711/158 |
| 8,266,619 B2 | 9/2012 | Ye et al. | |
| 8,341,437 B2 | 12/2012 | Allalouf et al. | |
| 8,402,466 B2 | 3/2013 | Bauer et al. | |
| 8,510,496 B1 | 8/2013 | Totolos, Jr. et al. | |
| 8,638,805 B2 | 1/2014 | Sundararaman et al. | |
| 8,706,896 B2 | 4/2014 | Zhang et al. | |
| 8,886,899 B1 | 11/2014 | Bao | |
| 8,924,661 B1 | 12/2014 | Shachar et al. | |
| 8,949,555 B1 | 2/2015 | Karamcheti et al. | |
| 2002/0126673 A1 | 9/2002 | Dagli et al. | |
| 2003/0131164 A1 | 7/2003 | Abramson et al. | |
| 2003/0172104 A1 | 9/2003 | Hooman et al. | |
| 2003/0182349 A1 | 9/2003 | Leong et al. | |
| 2004/0049628 A1 | 3/2004 | Lin et al. | |
| 2005/0055694 A1* | 3/2005 | Lee ...................... | G06F 9/4881 |
| | | | 718/100 |
| 2005/0175014 A1 | 8/2005 | Patrick | |
| 2005/0182747 A1 | 8/2005 | Nakamoto et al. | |
| 2006/0280119 A1 | 12/2006 | Karamanolis et al. | |
| 2007/0143761 A1 | 6/2007 | Deng | |
| 2008/0023747 A1 | 1/2008 | Park et al. | |
| 2008/0059690 A1 | 3/2008 | Mittal et al. | |
| 2008/0298372 A1 | 12/2008 | Basso et al. | |
| 2009/0006739 A1 | 1/2009 | Lubbers et al. | |
| 2009/0157919 A1 | 6/2009 | Dodson et al. | |
| 2009/0198868 A1 | 8/2009 | Zhang et al. | |
| 2009/0217030 A1 | 8/2009 | Premkumar et al. | |
| 2010/0056456 A1 | 3/2010 | Kim et al. | |
| 2010/0122065 A1 | 5/2010 | Dean et al. | |
| 2010/0153659 A1 | 6/2010 | Lovell et al. | |
| 2010/0180070 A1 | 7/2010 | Kim et al. | |
| 2010/0332696 A1 | 12/2010 | Muppirala et al. | |
| 2011/0125947 A1 | 5/2011 | Dodson et al. | |
| 2011/0149977 A1 | 6/2011 | Thomas et al. | |
| 2011/0161974 A1 | 6/2011 | Kurabayashi et al. | |
| 2011/0231856 A1 | 9/2011 | Son et al. | |
| 2012/0066447 A1 | 3/2012 | Colgrove et al. | |
| 2012/0140633 A1 | 6/2012 | Stanwood et al. | |
| 2012/0173778 A1 | 7/2012 | Povaliaev et al. | |
| 2012/0260256 A1* | 10/2012 | De Faria ............... | G06F 9/5011 |
| | | | 718/103 |
| 2012/0324160 A1 | 12/2012 | Liu et al. | |
| 2012/0327779 A1 | 12/2012 | Gell et al. | |
| 2012/0331083 A1 | 12/2012 | Li et al. | |
| 2013/0003480 A1 | 1/2013 | D'Abreu et al. | |
| 2013/0054841 A1 | 2/2013 | Padia et al. | |
| 2013/0060981 A1 | 3/2013 | Horn et al. | |
| 2013/0074088 A1 | 3/2013 | Purcell et al. | |
| 2013/0125127 A1 | 5/2013 | Mital et al. | |
| 2013/0232500 A1 | 9/2013 | Zaroo et al. | |
| 2013/0339555 A1 | 12/2013 | Schushan et al. | |
| 2014/0082629 A1 | 3/2014 | Ash et al. | |
| 2014/0109100 A1 | 4/2014 | Kurihara et al. | |
| 2014/0137128 A1 | 5/2014 | Chang et al. | |
| 2014/0143483 A1 | 5/2014 | Meir et al. | |
| 2014/0143508 A1 | 5/2014 | Kwon et al. | |
| 2014/0189217 A1 | 7/2014 | Marukame et al. | |
| 2014/0195699 A1 | 7/2014 | Sokol, Jr. et al. | |
| 2014/0211627 A1 | 7/2014 | Xu et al. | |
| 2014/0281050 A1 | 9/2014 | Vogan | |
| 2014/0281083 A1* | 9/2014 | Canepa ................. | G06F 13/364 |
| | | | 710/112 |
| 2015/0067291 A1* | 3/2015 | Miyamoto ............ | G06F 3/0688 |
| | | | 711/167 |
| 2015/0074294 A1 | 3/2015 | Shacham et al. | |
| 2015/0254004 A1 | 9/2015 | Colgrove et al. | |
| 2015/0339162 A1* | 11/2015 | Kose ...................... | G06F 9/505 |
| | | | 718/105 |
| 2015/0347327 A1 | 12/2015 | Blaine et al. | |
| 2016/0092272 A1 | 3/2016 | Karaje et al. | |
| 2016/0162416 A1* | 6/2016 | Boyd .................. | G06F 12/0246 |
| | | | 711/202 |
| 2016/0179404 A1 | 6/2016 | Nanduri et al. | |
| 2016/0266928 A1 | 9/2016 | Rimoni | |
| 2016/0266934 A1 | 9/2016 | Rimoni | |

OTHER PUBLICATIONS

Stuecheli, et al., "The Virtual Write Queue: Coordinating DRAM and Last-Level Cache Policies", ISCA'10, Jun. 19-23, 2010, Saint-Malo, France, 11 pages.

Caldera International, Inc., "Increasing disk I/O throughput by increasing the buffer cashce size," Feb. 11, 2003, last retrieved from http://osr507doc.xinos.com/en/PERFORM/increase_buffer_cache.html on Mar. 26, 2017.

Caldera International, Inc., "Tuning the number of buffer cache hash queues," Feb. 11, 2003, last retrieved from http://osr507doc.xinous.com/en/PERFORM/increase_buffer_cache.html on Mar. 26, 2017.

Non-final office action dated Jan. 12, 2017 in U.S. Appl. No. 14/693,784.

Final office action dated May 16, 2017 in U.S. Appl. No. 14/693,784.

Wikipedia, "Proprietary protocal," Mar. 27, 2015, last retrieved from https://en.wikipedia.org/w/index.php?title=Proprietary_protocol&oldid=653755214 on Dec. 27, 2016.

* cited by examiner

TASK QUEUES

CROSS-REFERENCE TO RELATED APPLICATIONS

The present application is a continuation of U.S. patent application Ser. No. 15/970,412, filed on May 8, 2018, which application is a continuation of U.S. patent application Ser. No. 14/693,784, filed on Apr. 22, 2015, now U.S. Pat. No. 9,965,323, which claims benefit of U.S. Provisional Application No. 62/131,777 filed Mar. 11, 2015. Each of the aforementioned patent applications are herein incorporated by reference.

FIELD OF THE DISCLOSURE

The present disclosure is generally related to task queues.

BACKGROUND INFORMATION

Field

Non-volatile data storage devices, such as embedded memory devices (e.g., embedded MultiMedia Card (eMMC) devices) and removable memory devices (e.g., removable universal serial bus (USB) flash memory devices and other removable storage cards), have allowed for increased portability of data and software applications. Users of non-volatile data storage devices increasingly rely on the devices to store and provide rapid access to a large amount of data.

A data storage device (e.g., a non-volatile data storage device) may be coupled to an access device. The data storage device may receive, from the access device, task declarations that specify tasks to be performed by the data storage device. An efficiency of the data storage device to complete tasks received from the access device may depend on a manner in which the data storage device orders and/or schedules the multiple tasks to be executed.

DETAILED DESCRIPTION

Particular implementations are described with reference to the drawings. In the description, common features are designated by common reference numbers throughout the drawings. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term).

Figure 1:
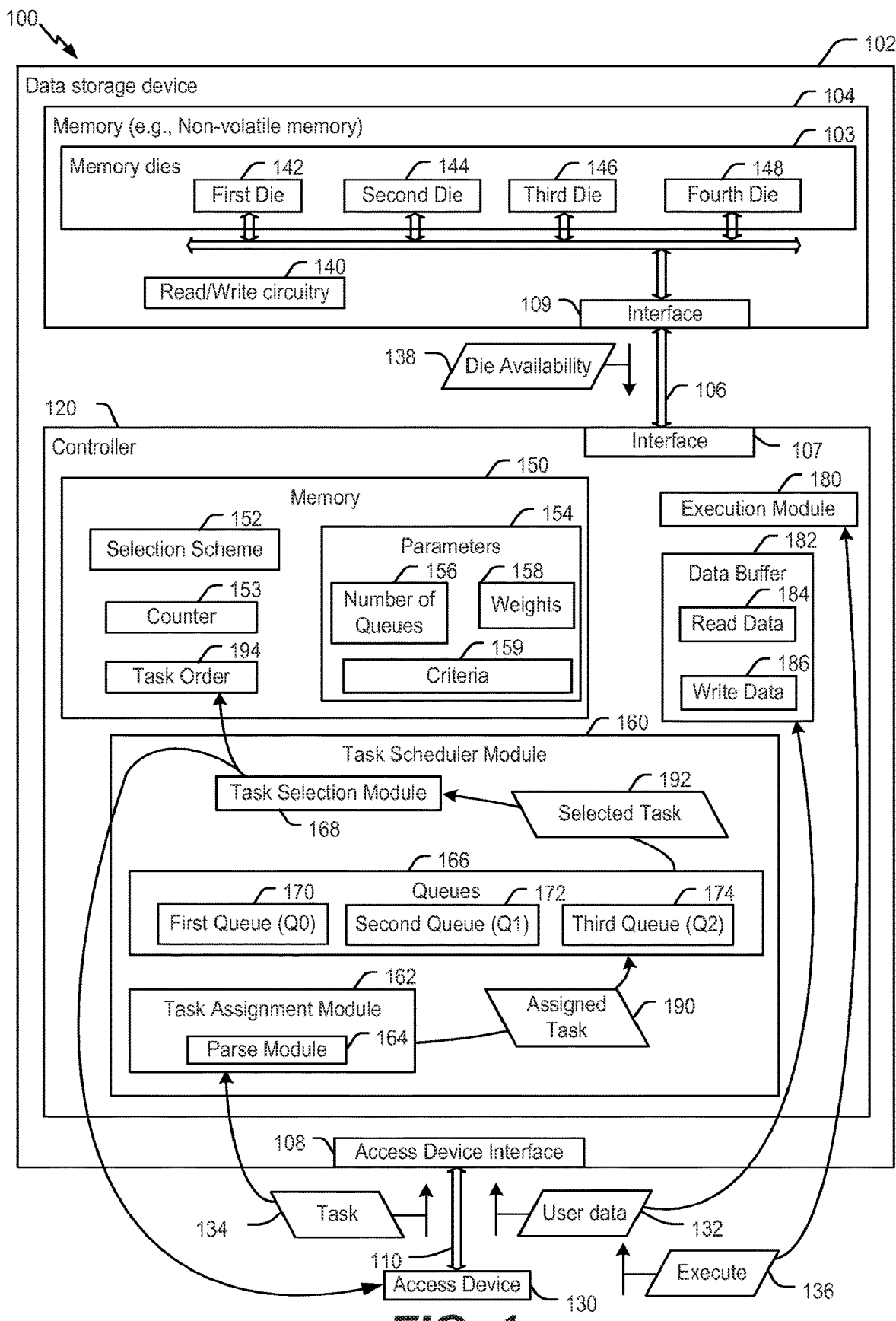
FIG. 1 is a block diagram of a particular illustrative aspect of a system configured to use multiple task queues.

Referring to FIG. 1, a particular illustrative example of a system is depicted and generally designated 100. The system 100 includes a data storage device 102 and an access device 130. The data storage device 102 includes a controller 120 and a memory 104, such as a non-volatile memory, that is coupled to the controller 120.

The data storage device 102 may be configured to use multiple task queues 166 to schedule tasks, such as tasks received from the access device 130. For example, the data storage device 102 may assign tasks received from the access device 130 among the multiple task queues 166. The multiple task queues 166 may be configured based on an architecture (e.g., one or more architectural aspects) of the data storage device 102. To illustrate, the multiple task queues 166 may be configured based on a number of dies included in the memory 104 of the data storage device 102, a width of a data bus 106 coupled to the memory 104 and to the controller 120 of the data storage device 102, a size of a data buffer 182 included in the controller 120, or a combination thereof. Additionally or alternatively, the data storage device 102 may select tasks from the multiple task queues 166 to determine an order associated with execution of the tasks. By configuring the multiple task queues 166 based on the architecture of the data storage device 102, tasks may be organized and efficiently performed at the memory 104 of the data storage device 102.

To illustrate, the controller 120 may be configured to access one or more parameters 154 to determine a number of queues 156 to be included in multiple task queues 166. The one or more parameters 154 may include or may be based on architectural parameters of the data storage device 102, such as a number of dies included in the memory 104, a width of a data bus 106 coupled to the controller 120 and to the memory 104, and/or a size of a data buffer 182 of the controller 120, as illustrative, non-limiting examples. In some implementations, the number of queues 156 (e.g., a number of task queues) may be three and the multiple task queues 166 may include a first queue (Q0) 170, a second queue (Q1) 172, and a third queue (Q2) 174.

The controller 120 may be configured to receive one or more tasks, such as a task 134, from an access device 130. The task 134 may be associated with an instruction, a command, or a request, from the access device 130, and the task 134 may be performed by the data storage device 102. The controller 120 may determine at least one characteristic of the task 134. For example, the task 134 may include one or more fields that indicate the at least one characteristic of the task 134. The at least one characteristic may include a write operation, a read operation, a high priority operation, an address, a data size, and/or a protocol, as illustrative, non-limiting examples. The controller 120 may perform a comparison between the at least one characteristic and one or more criteria 159 and may assign the task 134 to a particular queue of the multiple task queues 166 based on the comparison. Assigning the task 134 to the particular queue may include storing task data associated with the task 124 at a memory location corresponding to the particular queue. In some implementations, the one or more criteria 159 may be based on the architectural parameters and/or operational parameters of the data storage device 102. For example, the one or more criteria 159 may include a page size of the memory 104 and a read task received by the controller 120 may be assigned to a particular queue of the multiple task queues 166 based on an amount of data to be read responsive to execution of the read task as compared to the page size of the memory 104. By assigning tasks to the multiple task queues 166 (based on the architecture of the data storage device 102), the tasks may be organized to be selected in a manner that promotes efficient execution of the tasks based on the architecture of the data storage device 102.

The controller 120 may be configured to select tasks from the multiple task queues 166 based on a selection scheme 152. The selection scheme 152 may indicate a selection sequence (e.g., an order) in which individual queues of the multiple task queues 166 are selected. Examples of selection schemes are described further herein with reference to FIGS. 2-4. After a particular queue is selected according to the selection sequence, the controller 120 may select one or more tasks from the particular queue. A number of tasks that may be consecutively selected from the particular queue may be determined based on a weight value of the particular queue. The weight value, such as one of the one or more weights 158, may be based on the architecture of the data storage device 102. For example, the weight value may be based on a number of dies of the memory 104 and/or a size of a memory access operation (e.g., a read operation or a write operation), as illustrative, non-limiting examples. In some implementations, the controller 120 may be configured to dynamically modify the weight value of the particular queue based on die availability information 138 received from the memory 104. A task order 194 in which the tasks are selected from the multiple task queues 166 may indicate an order in which the tasks are to be processed to perform memory access operations. By selecting tasks from the multiple task queues 166 and/or by using a weight value to select multiple tasks from a particular queue, an order of execution of the tasks may be determined that promotes efficient execution of the tasks based on the architecture of the data storage device 102.

The data storage device 102 and the access device 130 may be operationally coupled via a connection (e.g., a communication path 110), such as a bus or a wireless connection. For example, the data storage device 102 may include an access device interface 108 that enables communication via the communication path 110 between the data storage device 102 and the access device 130, such as when the access device interface 108 is communicatively coupled to the access device 130. The data storage device 102 may be embedded within the access device 130, such as in accordance with a Joint Electron Devices Engineering Council (JEDEC) Solid State Technology Association Universal Flash Storage (UFS) configuration. Alternatively, the data storage device 102 may be removable from the access device 130 (i.e., "removably" coupled to the access device 130). As an example, the data storage device 102 may be removably coupled to the access device 130 in accordance with a removable universal serial bus (USB) configuration. In some implementations, the data storage device 102 may include or correspond to a solid state drive (SSD), which may be used as an embedded storage drive (e.g., a mobile embedded storage drive), an enterprise storage drive (ESD), a client storage device, or a cloud storage drive, as illustrative, non-limiting examples. In some implementations, the data storage device 102 may be coupled to the access device 130 indirectly, e.g., via a network. For example, the data storage device 102 may be a network-attached storage (NAS) device or a component (e.g. a solid-state drive (SSD) device) of a data center storage system, an enterprise storage system, or a storage area network.

For example, the data storage device 102 may be configured to be coupled to the access device 130 as embedded memory, such as eMMC® (trademark of JEDEC Solid State Technology Association, Arlington, Va.) and eSD, as illustrative examples. To illustrate, the data storage device 102 may correspond to an eMMC (embedded MultiMedia Card) device. As another example, the data storage device 102 may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). The data storage device 102 may operate in compliance with a JEDEC industry specification. For example, the data storage device 102 may operate in compliance with a JEDEC eMMC specification, a JEDEC Universal Flash Storage (UFS) specification, one or more other specifications, or a combination thereof. In some implementations, the data storage device 102 and the access device 130 may be configured to communicate according to a JEDEC eMMC 5.1 standard.

The data storage device 102 and the access device 130 may be configured to communicate using one or more protocols, such as an eMMC protocol, a universal flash storage (UFS) protocol, a universal serial bus (USB) protocol, a serial advanced technology attachment (SATA) protocol, and/or another protocol, as illustrative, non-limiting examples. The one or more protocols may include a standardized protocol and/or a non-standardized protocol, such as a proprietary protocol. In some implementations, the data storage device 102 and the access device 130 may be configured to communicate using dual channel communication (e.g., both devices may issue and receive commands from the other device).

The access device 130 may include a processor and a memory. The memory may be configured to store data and/or instructions that may be executable by the processor. The memory may be a single memory or may include multiple memories, such as one or more non-volatile memories, one or more volatile memories, or a combination thereof. The access device 130 may issue one or more commands to the data storage device 102, such as one or more requests to erase data from, read data from, or write data to the memory 104 of the data storage device 102. For example, the access device 130 may be configured to provide data, such as user data 132, to be stored at the memory 104 or to request data to be read from the memory 104. The access device 130 may include a mobile telephone, a music player, a video player, a gaming console, an electronic book reader, a personal digital assistant (PDA), a computer, such as a laptop computer or notebook computer, any other electronic device, or any combination thereof, as illustrative, non-limiting examples.

The access device 130 may include a memory interface (e.g., a data storage device interface) and may communicate via the memory interface to enables reading data from the memory 104 and writing data to the memory 104. For example, the access device 130 may operate in compliance with a Joint Electron Devices Engineering Council (JEDEC) industry specification, such as a Universal Flash Storage (UFS) Access Controller Interface specification. As other examples, the access device 130 may operate in compliance with one or more other specifications, such as a Secure Digital (SD) Access Controller specification, as an illustrative, non-limiting example. The access device 130 may communicate with the memory 104 in accordance with any other suitable communication protocol.

In some implementations, the access device 130 may transmit a task declaration message to the data storage device 102. The task declaration message may include at least one task, such as the task 134. Each task may include task information. The task information may indicate one or more characteristics of the task, such as a task identifier (ID), a priority flag (e.g., a high priority flag), a length of data to be transferred, a data start address, and/or a read/write operation type, as illustrative, non-limiting examples. After a task declaration messages (e.g., multiple tasks), the access device 130 may receive one or more notifications from the data storage device 102 that indicate an order in which multiple tasks are to be executed. The access device 130 may transmit an execution command for the multiple tasks according to the order. In some implementations, the access device 130 may issue and track up to a predetermined number of tasks. For example, the predetermined number of task may be equal to thirty-two, as an illustrative, non-limiting example. In this example, the access device 130 may issue up to thirty-two tasks having task IDs ranging from task_0 to task_31. When the access device 130 has thirty-two outstanding tasks to be completed, the access device 130 may not issue another task until one of the thirty-two outstanding tasks is completed. To illustrate, after execution of a particular task (a task having task ID of task_15) is completed, the access device 130 may issue a new task. The new task may be assigned a task ID of task_15.

The memory 104 of the data storage device 102 may include a non-volatile memory. The memory 104 may have a two-dimensional (2D) memory configuration. Alternatively, the memory 104 may have another configuration, such as a three-dimensional (3D) memory configuration. For example, the memory 104 may include a three-dimensional (3D) memory configuration that is monolithically formed in one or more physical levels of arrays of memory cells having an active area disposed above a silicon substrate. In some implementations, the memory 104 may include circuitry associated with operation of the memory cells (e.g., storage elements).

The memory 104 may include one or more memory dies 103. For example, the one or more memory dies 103 may include a first die 142, a second die 144, a third die 146, and a fourth die 148. Although the one or more memory dies 103 are depicted as including four dies, in other implementations, the one or more memory dies 103 may include more than or fewer than four dies. In some implementations, each of the dies 142-148 may include one or more groups of storage elements. Each group of storage elements may include multiple storage elements (e.g., memory cells) and may be configured as a page or a word line.

The memory 104 may include support circuitry, such as read/write circuitry 140, to support operation of the one or more memory dies 103. Although depicted as a single component, the read/write circuitry 140 may be divided into separate components of the memory 104, such as read circuitry and write circuitry. The read/write circuitry 140 may be external to one or more memory dies of the memory 104. Alternatively, one or more individual memory dies 142-148 may include corresponding read/write circuitry that is operable to read data from and/or write data to storage elements within the individual memory die independent of any other read and/or write operations at any of the other memory dies.

The controller 120 is coupled to the memory 104 (e.g., the one or more memory dies 103) via the data bus 106, an interface 107 (e.g., interface circuitry) of the controller 120, an interface 109 of the memory 104, another structure, or a combination thereof. For example, if the one or more memory dies 103 include multiple memory dies, the data bus 106 may include multiple distinct channels to enable the controller 120 to communicate with each of the multiple memory dies in parallel with, and independently of, communication with the other memory dies. In some implementations, the memory 104 may be a flash memory.

The controller 120 is configured to receive data and instructions from the access device 130 and to send data to the access device 130. For example, the controller 120 may send data to the access device 130 via the access device interface 108, and the controller 120 may receive data from the access device 130 via the access device interface 108. The controller 120 is configured to send data and commands to the memory 104 and to receive data from the memory 104. For example, the controller 120 is configured to send data and a write command to cause the memory 104 to store data to a specified address of the memory 104. The write command may specify a physical address of a portion of the memory 104 (e.g., a physical address of a word line of the memory 104) that is to store the data. The controller 120 is configured to send a read command to the memory 104 to access data from a specified address of the memory 104. The read command may specify the physical address of a portion of the memory 104 (e.g., a physical address of a word line of the memory 104).

The controller 120 may include a second memory 150, a task scheduler module 160, an execution module 180, and a data buffer 182. The execution module 180 may be configured to execute tasks received from the access device 130. The data buffer 182 may be configured to buffer read data 184 and write data 186. The write data 186 may include data received from the access device 130 to be written to the memory 104. The read data 184 may include data read from the memory 104 to be provided to the access device 130. In some implementations, the data buffer 182 may include a cache memory.

The task scheduler module 160 (e.g., a task module) may be configured to receive tasks from the access device 130 and to distribute the received tasks among the multiple task queues 166. For example, the task scheduler module 160 may classify each received task and may assign a classified task to one of the multiple task queues 166. The task scheduler module 160 may also be configured to select the tasks from the multiple task queues 166 to determine the task order 194 that is associated with an order of execution of the tasks. The task scheduler module 160 may include a task assignment module 162, multiple task queues 166, and a task selection module 168.

The multiple task queues 166 may include the first queue (Q0) 170, the second queue (Q1) 172, and the third queue (Q2) 174. Each queue of the multiple task queues 166 may be configured for storage of task data related to a memory operation to be performed at the memory 104. For example, each queue of the multiple task queues 166 may be configured to operate as a first-in, first-out buffer. The multiple task queues 166 may be associated with the one or more criteria 159 that indicate what type of tasks each queue is configured to receive and store. For example, the one or more criteria 159 may indicate that the first queue (Q0) 170 is configured to receive high priority tasks. As another example, the one or more criteria 159 may indicate that the second queue (Q1) 172 is configured to receive read tasks and that the third queue (Q2) 174 is configured to receive write tasks. Additionally or alternatively, the one or more criteria 159 may indicate an address, a data size, and/or a protocol that may be used to determine which queue of the multiple task queues 166 should receive a particular task.

The task assignment module 162 may be configured to receive tasks from the access device 130 and to assign (e.g., store) each task to one of the multiple task queues 166, as described further herein. The task assignment module 162 may include a parse module 164 that is configured to parse a received task, such as the task 134, to identify at least one characteristics of the task 134. For example, the task 134 may include one or more fields that each include data that indicates the at least one characteristic. The task assignment module 162 may compare the at least one characteristic of the task 134 to the one or more criteria 159 associated with the multiple task queues 166. Based on the comparison, the task assignment module 162 may identify a particular queue of the multiple task queues 166 and may assign the task 134 to the particular queue. For example, the parse module 164 may identify that the task 134 is a high priority task, and the task assignment module 162 may determine that the task 134 is to be assigned to the first queue (Q0) 170. The task assignment module 162 may send the task 134 to the multiple task queues 166 as an assigned task 190 to the first queue (Q0) 170.

The assigned task 190 (e.g., the task 134) may be stored in a particular queue, such as a register, a buffer, a memory, or other storage structure. For example a portion or an entirety of the task 134 may be stored in the particular queue. In some implementations, the assigned task 190 may include a task identifier of the task 134. The assigned task 190 (e.g., the task identifier) may be stored in the particular queue and the task 134 (e.g., an entirety of the task 134) may be stored at the second memory 150 at a location that is separate from the particular queue.

The task selection module 168 may be configured to select tasks from a queue of the multiple task queues 166. To select a task, the task selection module 168 may select a particular queue based on the selection scheme 152. For example, the first queue (Q0) 170 may be selected according to the selection scheme 152 (e.g., a queue selection scheme). After the particular queue is selected, the task selection module 168 may select a task from the particular queue. Selection of the task 134 from the particular queue may include identifying (e.g., reading) and/or removing an entirety or a portion of a particular task from the particular queue. In some implementations, the task selection module 168 may read a task identifier from the particular queue.

To illustrate, a selected task 192 (corresponding to the task 134) may be selected from the first queue (Q0) 170. The task selection module 168 may cause the selected task 192 to be included in the task order 194 which indicates an order in which tasks are to be executed. For example, the task selection module 168 may store the selected task 192 in the task order 194. To illustrate, the task selection module 168 may store at least a portion of the task 134, such as a task identifier of the task 134, in the task order 194. The order in which tasks are to be executed may be based on an order which the task selection module 168 selects tasks from the multiple task queues 166.

In some implementations, the task selection module 168 may send an indication of the selected task 192 to the access device 130 to inform the access device 130 that the selected task 192 (e.g., the task 134) is scheduled to be executed. Additionally or alternatively, the access device 130 may poll the data storage device 102 to find out (e.g., determine) which task(s) have been selected by the task selection module 168. For example, the access device 130 may send a request to the data storage device 102 to indicate one or more selected tasks and, in response to the request, the data storage device 120 may send the task order 194 to the access device 130. In some implementations, the data storage device 102 may interrupt the access device 130 and, after the interrupt, the access device 130 may poll the data storage device 102 to request the data storage device 102 to indicate which task(s) has been selected by the task selection module 168. The access device 130 may maintain and update an execution task list of tasks to be executed by the data storage device 102. For example, the access device 130 may update the execution task list based on one or more notifications received from the data storage device 102 and associated with tasks selected by the task selection module 168.

The second memory 150 may include a volatile memory, a non-volatile memory, or a combination of volatile and non-volatile memory. For example, the second memory 150 may include a read only memory (ROM), a random access memory (RAM), or a combination thereof. The second memory 150 may include the selection scheme 152, a counter 153, the task order 194 (e.g., an ordered list of tasks), and one or more parameters 154. When the second memory 150 is a volatile memory, the selection scheme 152 and the one or more parameters 154 may be stored in a non-volatile memory, such as the memory 104, and loaded into the second memory 150. Additionally or alternatively, the data storage device 102 may include firmware (e.g., a set of one or more instructions) that is stored in a non-volatile memory of the data storage device 102 and loaded into a volatile memory, such as the second memory 150.

The one or more parameters 154 may indicate or may be based on one or more architectural aspects of the data storage device 102, as described further herein. The one or more architectural aspects of the data storage device 102 may include a number of dies included in the memory 104, a width (e.g., an amount of data to be communicated during a processing cycle of the data storage device 102) of the data bus 106 coupled to the controller 120 and to the memory 104, and/or a size of the data buffer 182 of the controller 120, as illustrative, non-limiting examples. The one or more parameters 154 may include a number of queues 156, one or more weights 158, and the one or more criteria 159. The number of queues 156 may indicate a number or distinct queues to be included in the multiple task queues 166. The one or more criteria 159 parameters indicate what type of tasks each queue of the multiple task queues 166 is configured to receive and store.

The one or more weights 158 may include one or more weight values. A weight value may correspond to a queue of the multiple task queues 166 and may indicate a number of tasks that may be selected (e.g., consecutively selected) from the queue. To illustrate, the one or more weights 158 may include a first weight value and a second weight value. The first weight value may correspond to the second queue (Q1) 172 and may indicate a first number of tasks that may be selected (e.g., consecutively selected) from the second queue (Q1) 172. The second weight value may correspond to the third queue (Q2) 174 and may indicate a second number of tasks that may be selected (e.g., consecutively selected) from the third queue (Q2) 174. The first weight value and the second weight value may be the same value or different values. In some implementations, one or more of the multiple task queues 166 may not be associated with a weight value. For example, the first queue (Q0) 170 may not have a corresponding weight value and tasks may be selected from the first queue (Q0) 170 without checking other queues. To illustrate, tasks may be consecutively selected from the first queue (Q0) 170 until no more tasks are included in the first queue (Q0) 170.

The selection scheme 152 may indicate a queue selection order in which queues of the multiple task queues 166 may be selected. In some implementations, the selection scheme 152 may be implemented by the task selection module 168. The selection scheme 152 may use the one or more parameters to determine the queue selection order. For example, the selection scheme 152 may be configurable to determine a queue selection based on the number of queues 156. As another example, the selection scheme 152 may use the one or more criteria, such as whether a particular queue is designated as a high priority queue, to determine the queue selection order. Examples of the selection scheme 152 as applied to multiple task queues are described with reference to FIGS. 3 and 4.

The counter 153 may be configured to indicate a number of tasks selected (e.g., consecutively selected) from a queue of the multiple task queues 166. For example, the counter 153 may be set to an initial value (e.g., zero) in response to a new queue, such as the second queue (Q1) 172, being selected. Each time a task is selected from the second queue (Q1) 172, the counter 153 may be adjusted (e.g., incremented), and the value of the counter 153 may be compared to the first weight value of the second queue (Q1). If the value of the counter 153 is equal to the first weight value, a next queue may be selected according to the selection scheme 152, and the value of the counter 153 may be reset to the initial value (e.g., zero). In some implementations, the task selection module 168 may be configured to compare the value of the counter 153 to a weight value. Although the counter 153 is described as being set to an initial value of zero and incremented each time a task is selected, in other implementations, the counter 153 may be set to a weight value of a selected queue and may be decremented each time a task is selected. A next queue may be selected when the value of the counter 153 is equal to predetermined value (e.g., zero).

The task order 194 may indicate an order in which the tasks are to be processed to perform memory access operations. In some implementations, the task order 194 may be provided to the access device 130 to notify the access device 130 of the order in which multiple tasks are to be processed. For example, the controller 120 may send the task order 194 to the access device 130 in addition to or instead of the task selection module 168 individually notifying the access device of each task selected from the multiple task queues 166.

During operation, the data storage device 102 may receive the task 134 from the access device 130. In some implementations, the task 134 may be associated with a memory access operation, such as a write request to store the user data 132 at the memory 104. The task assignment module 162 may assign the task 134 to a particular queue (e.g., a FIFO) of the multiple task queues 166. For example, the task assignment module 162 may store a task identifier of the task 134 in the particular queue and may store the task 134 in the second memory 150.

After the task 134 is assigned to the particular queue, the task selection module 168 may select the particular queue from the multiple task queues 166 according to the selection scheme 152 and may select the task 134 from the particular queue. For example, the task selection module 168 may read the task identifier of the task 134 from the particular queue and may add the task identifier to the task order 194.

Selection of the task 134 from the multiple task queues 166 may indicate that task 134 is ready to be processed to perform the memory access operation. The task selection module 168 may notify the access device 130 that the task 134 is ready to be processed.

Responsive to notifying the access device 130, the controller 120 may receive an execute command 136 and the user data 132 from the access device 130. The execute command 136 and the user data 132 may be associated with the task 134. For example, the execute command 136 may include the task identifier of the task 134. The task identifier of the task 134 may enable the execution module 180 to read the task 134 stored at the second memory 150. To illustrate, the execution module 180 may identify the task identifier included in the execute command 136. The execution module 180 may retrieve (e.g., read) the task 134 from the second memory 150 based on the task identifier. For example, multiple tasks may be stored at the second memory 150 and the multiple tasks may be indexed (e.g., retrievable) using task identifiers. After retrieving the task 134 from the second memory 150, the execution module 180 may initiate execution of the task 134. Although the user data 132 and the execute command 136 are illustrated as being received separately by the controller 120, in other implementations the user data 132 and the execute command 136 may be received at the same time. For example, the execute command 136 may include the user data 132.

The controller 120 may store the user data 132 in the data buffer 182 as the write data 186. The execute command 136 may be received at the execution module 180. In response to receiving the execute command 136, the execution module 180 may execute the task 134 to write the user data 132 to the memory 104. For example, the user data 132 may be sent to the memory 104 via the data bus 106 and may be written to a one or more dies of the one or more memory dies 103 by the read/write circuitry 140.

The multiple task queues 166 may include a high priority queue, a read queue, a write queue, a protocol-based queue, or a combination thereof, as illustrative, non-limiting examples. For example, the first queue (Q0) 170 may be designated as a high priority queue, the second queue (Q1) 172 may be designated a read queue, and the third queue (Q2) 174 may be designated as a write queue. The first queue (Q0) 170 (e.g., the high priority queue) may be configured to receive tasks having a priority flag. For example, the one or more criteria 159 may indicate that tasks that have an asserted priority flag are to be assigned to the first queue (Q0) regardless of whether the task is a read task or a write task. A high priority task may include a read task or a write task. The task scheduler module 160 may be configured to select high priority tasks from the multiple task queues 166 so that the high priority tasks do not stay in the multiple task queues 166 for an extended period. In some implementations, the multiple task queues 166 may not include a high priority queue, and the high priority tasks may be automatically selected to be processed by the task selection module 168 without delay, as described with reference to FIG. 4.

The second queue (Q1) 172 may be configured to receive read tasks. For example, the one or more criteria 159 may indicate that read tasks that do not have an asserted priority flag are to be assigned to the second queue (Q1) 172. The third queue (Q2) 174 may be configured to receive write tasks. For example, the one or more criteria 159 may indicate that write tasks that do not have an asserted priority flag are to be assigned to the third queue (Q2) 174.

In some implementations, the multiple task queues 166 may include multiple read queues, such as a first read queue (e.g., a short read queue) and a second read queue (e.g., a long read queue), as illustrative, non-limiting examples. A particular read task may be assigned to one of the first read queue or the second read queue based on an amount of data to be read from the memory 104 according to the particular read task. For example, the one or more criteria 159 may include a read threshold. If the amount of data to be read from the memory 104 based on the particular read task is less than or equal to the read threshold, the particular read task may be classified as a short read task and may be assigned to the first read queue (e.g., the short read queue). If the amount of data to be read from the memory 104 based on the particular read task is greater than the read threshold, the particular read task may be classified as a long read task and may be assigned to the second read queue (e.g., the long read queue). The read threshold may be determined based on an architectural aspect of the data storage device 102, such as a size of a physical unit of the memory 104, as described further herein.

In some implementations, the multiple task queues 166 may include multiple write queues, such as a first write queue (e.g., a short write queue), a second write queue (e.g., a long write queue), and a third write queue (e.g., a post-programming write queue), as illustrative, non-limiting examples. A write ask may be assigned to one of the first write queue, the second write queue, or the third write queue based on an amount of data to be written to the memory 104 and/or based on whether the data to be written to the memory 104 is to be directly written to the memory 104 from the access device 130. For example, the third write queue may be configured to receive tasks associated with write operations that write data from the access device 130 directly to the memory 104. The first write buffer and the second write buffer may be configured to receive write tasks that are provided from the access device 130 to an intermediate buffer (e.g., a cache), such as the data buffer 182, prior to being written to the memory 104. A particular write task associated with writing data to the data buffer 182 may be assigned to one of the first write queue or the second write queue based on an amount of data to be written to the memory 104 according to the particular write task. For example, the one or more criteria 159 may include a write threshold. If the amount of data to be written to the memory 104 based on the particular write task is less than or equal to the write threshold, the particular write task may be classified as a short write task and may be assigned to the first write queue (e.g., the short write queue). If the amount of data to be written to the memory 104 based on the particular write task is greater than the read threshold, the particular write task may be classified as a long write task and may be assigned to the second write queue (e.g., the long write queue). The write threshold may be determined based on an architectural aspect of the data storage device 102, such as a size of a physical unit of the memory 104, as described further herein.

A protocol-based queue may be configured to receive tasks associated with a service protocol. The service protocol may be may be used to enable communication between the access device 130 and the data storage device 102 and may include a proprietary protocol and/or a non-standardized protocol or a standard specified control protocol, as illustrative, non-limiting examples. For example, the service protocol may include a command tunneling protocol that is used to interact between a proprietary service application running on the access device 130 and a corresponding application running on the data storage device 102. The service protocol may be used by the access device 130 and the data storage device 102 in addition to another protocol, such as a standardized protocol. Examples of standardized protocols may include an eMMC protocol, a universal flash storage (UFS) protocol, a universal serial bus (USB) protocol, or a serial advanced technology attachment (SATA) protocol, as illustrative, non-limiting examples. Tasks received by the data storage device 102 from the access device 130 may include tasks associate with the service protocol, tasks associated with another protocol (e.g., a non-service protocol, such as a standardized protocol that is different than the service protocol), or a combination thereof. A particular task associated with the service protocol may be assigned to the protocol-based queue and other tasks may be assigned to another of the multiple task queues 166.

In some implementations, data stored at the memory 104 may be stored in units referred to as sectors. Each sector may include 512 bytes, as an illustrative, non-limiting example. Each logical block address (LBA) of the memory 104 may correspond to a sector. Eight sectors may be referred to a physical unit (and/or generally referred to as four kilo bytes (kbytes)). In some implementations, the read threshold included in the one or more criteria 159 may be equal to a size of a physical unit. Additionally or alternatively, the write threshold included in the one or more criteria 159 may be equal to a size of the physical unit.

The execution module 180 and/or the read/write circuitry 140 may be configured to read up to eight physical units (e.g., thirty-two kbytes) of the memory 104 in parallel during a single access read operation. For example, the single access read operation may be configured to read the eight physical units (e.g., thirty-two kbytes) from four dies of the memory 104 in parallel, with no more than two physical units being read from each die. The single access read operation may be performed during a single processing cycle of the memory 104. A bus width of the data bus 106 may enable up to thirty-two kbytes of data to be communicated between the controller 120 and the memory 104 (e.g., four dies). If the one or more memory dies 103 include eight dies (e.g., dies 0-7), a first bus transaction may communicate a first group of thirty-two kbytes of data to a first set of four dies (e.g., dies 0-3), and a second bus transaction may communicate a second group of thirty-two kbytes of data to a second set of four dies (e.g., dies 4-7). A weight value of a read queue, such as the second queue (Q1) 172, may be based on a number of physical units that may be read during the single access read operation. For example, if the second queue (Q1) 172 is the first read queue (e.g., the short read queue), the weight value of the second queue (Q1) 172 may be equal to a value of eight. To illustrate, eight short read tasks may be selected, which corresponds to two short read tasks being performed on each of four dies during a single access read operation. Selection of multiple tasks (e.g., eight short read tasks) to be executed by a plurality of memory dies during a single access read operation may reduce execution starvation (e.g., one or more dies being idle) of the memory dies (e.g., the memory dies 103). If the second queue (Q1) 172 is the second read queue (e.g., the long read queue), the weight value of the second queue (Q1) 172 may be equal to a value of one. To illustrate, a single long read task may be selected to be performed at the memory 104. A read operation associated with a task assigned to the second read queue may need multiple processing cycles of the memory 104 to be completed.

The execution module 180 and/or the read/write circuitry 140 may be configured to write up to four physical units (e.g., sixteen kbytes) of the memory 104 in parallel during a single access write operation. For example, the single access write operation may be configured to write four physical units (e.g., sixteen kbytes) to four dies of the memory 104 in parallel, with no more than one physical unit being written to each die. The single access write operation may be performed during the single processing cycle of the memory 104. A weight value of a write queue, such as the third queue (Q2) 174, may be based on a number of physical units that may be written during the single access write operation. For example, if the third queue (Q2) 174 is the first write queue (e.g., the short write queue), the weight value of the third queue (Q2) 174 may be equal to a value of four. To illustrate, four short write tasks may be selected, which corresponds to a single short write task being performed on each of four dies during a single access write operation. Selection of multiple tasks (e.g., four short write tasks) to be executed by a plurality of memory dies during a single access write operation may reduce execution starvation, such as a particular die being idle, of the memory dies (e.g., the memory dies 103). If the third queue (Q2) 174 is the second write queue (e.g., the long write queue) or the third write queue (e.g., a post-programming write queue), the weight value of the third queue (Q2) 174 may be equal to a value of one. To illustrate, a single long write task may be selected to be performed at the memory 104. A write operation associated with a task assigned to the second write queue or the third write queue may need multiple processing cycles of the memory 104 to be completed.

In some implementations, a portion of the second memory 150 may be configured to be used as the multiple task queues 166. For example, the portion of the second memory 150 may be partitioned to include the queues 170-174 of the multiple task queues 166. To prevent a queue of the multiple task queues 166 from having an overflow condition, each queue is configured to be able to include a total number of tasks that may be stored in the multiple task queues 166. For example, if the total number of tasks that may be stored in the multiple task queues 166 is thirty-two, each queue of the multiple task queues 166 may be sized to include thirty-two tasks.

In some implementations, one or more modules (e.g., the execution module 180, the task scheduler module 160, the task assignment module 162, the parse module 164, and/or the task selection module 168) included in the controller 120 may be associated with firmware stored in a memory, such as the second memory 150 or the memory 104, and may be associated with a processor configured to access the firmware and to execute one or more instructions included in the firmware. The processor may be included in the controller 120 of the data storage device 102. In association with executing the firmware, the processor may access the one or more parameters 154 and/or the selection scheme 152. For example, the processor may access the number of queues 156 and may establish (e.g., create) a portion of the second memory 150 to operate as the multiple task queues 166 based on the number of queues 156.

In some implementations, the controller 120 may receive feedback, such as die availability information 138, from the memory 104. The die availability information 138 may indicate an availability of the memory dies 103 of the memory 104. For example, the die availability information 138 may indicate if a particular die is occupied processing a long term task, such as an erase operation. The controller 120 may use the die availability information 138 to adjust the one or more parameters 154, such as adjusting at least one of the weight values. To illustrate, if the one or more memory dies 103 include the four dies 142-148 and if the die availability information 138 indicates that the fourth die 148 is occupied processing a long task, a weight value of a first read queue (e.g., a short read queue) may be adjusted from being equal to eight to being equal to 6. Adjusting the one or more parameters 154 based on the die availability information 138 may avoid scheduling task that are supposed to access those dies that are currently unavailable or otherwise engaged in processing a long term task. Additionally or alternatively, in response to the task selection module 168 identifying a task to be selected from a particular queue, the controller 120 may determine if a target die of the task is unavailable (as indicated by the die availability information 138). If the target die is unavailable, the task selection module 168 may not select the task from the particular queue and may select a next task from the particular queue (e.g., the task may retain its position within the particular queue).

In some implementations, the selection scheme 152, the counter 153, the task order 194 (e.g., an ordered list), the one or more parameters, the multiple task queues 166, the data buffer 182, instructions (e.g., firmware), or a combination thereof, may be included in and/or stored at a non-volatile memory, such as the memory 104. In other implementations, the controller 120 may include or may be coupled to a particular memory, such as a random access memory (RAM) and/or a read only memory (ROM), that is configured to store and/or include one or more of the selection scheme 152, the counter 153, the task order 194, the one or more parameters 154, the multiple task queues 166, the data buffer 182, instructions (e.g., firmware), or a combination thereof, as illustrated in FIG. 1. For example, the counter 153, the task order 194, the multiple task queues 166, the one or more parameters 154, and the data buffer 182 may be stored in the RAM, while the selection scheme 152 and the instructions are stored in the ROM. In a particular implementation, the particular memory may include the second memory 150. Alternatively, or in addition, the controller 120 may include or may be coupled to another memory (not shown), such as a non-volatile memory, a RAM, or ROM. The other memory may be a single memory component, multiple distinct memory components, and/or may include multiple different types (e.g., volatile memory and/or non-volatile) of memory components. In some implementations, the other memory may be included in the access device 130.

Although one or more components of the data storage device 102 have been described with respect to the controller 120, in other implementations certain components may be included in the memory 104. For example, one or more of the second memory 150, the execution module 180, the data buffer 182, and/or the task scheduler module 160 may be included in the memory 104. Alternatively, or in addition, one or more functions as described above with reference to the controller 120 may be performed at or by the memory 104. For example, one or more functions of the second memory 150, the execution module 180, the data buffer 182, and/or the task scheduler module 160 may be performed by components and/or circuitry included in the memory 104.

Alternatively, or in addition, one or more components of the data storage device 102 may be included in the access device 130. For example, one or more of the second memory 150, the execution module 180, the data buffer 182, and/or the task scheduler module 160 may be included in the access device 130. Alternatively, or in addition, one or more functions as described above with reference to the controller 120 may be performed at or by the access device 130. For example, the one or more functions may be performed by a processor included in the access device 130. As an illustrative, non-limiting example, the data storage device 102 may provide first information to the access device 130 that indicates a number of queues of the multiple task queues 166 and includes the criteria 159 of the multiple task queues 166. Based on the first information received from the data storage device 102, the access device 130 may perform one or more functions described with reference to the task assignment module 162 and may provide tasks directly to the multiple task queues 166 of the data storage device 102. As another illustrative, non-limiting example, the data storage device 102 may provide second information to the access device 130 that includes the selection scheme 152 and/or the one or more parameters 154. Based on the second information received form the data storage device 102, the access device 130 may perform one or more functions described with reference to the task selection module 168. For example, the access device 130 may determine a particular queue of the multiple task queues 166 to be used to select one or more tasks and may determine a threshold number of tasks that may be selected from the particular queue. The access device 130 may send data that identifies the particular queue and that indicates the threshold number of tasks to the controller 120 (e.g., to the task schedule module 160).

Although specific sizes and/or values have been described with reference to the architecture and/or operation of the data storage device 102, such sizes and/or values are for explanation purposes and should not be considered limiting. For example, a size of a sector may be greater than or less than 512 kbytes. Additionally or alternatively, a physical unit may include more than or fewer than 8 sectors.

Thus, FIG. 1 provides the multiple task queues 166 configured and utilized based on the architecture and/or operation of the data storage device 102. For example, the operation of the data storage device 102 may be derived from the way in which the architecture is designed and/or the way in which memory access operations are configured to be performed. By assigning tasks to the multiple task queues 166 based on the one or more criteria 159 and/or by selecting tasks from the multiple task queues 166 according to the selection scheme 152, tasks may be organized and efficiently performed at the memory 104 of the data storage device 102. For example, tasks may be scheduled to be executed by a plurality of memory dies which may reduce execution starvation of the memory dies (e.g., the memory dies 103). The tasks may be selected in groups (based on a weight value) such that a group of selected tasks from a particular queue may be concurrently executed by the memory 104 during a memory access operation (e.g., performed during a single processing cycle of the memory 104).

Figure 2:
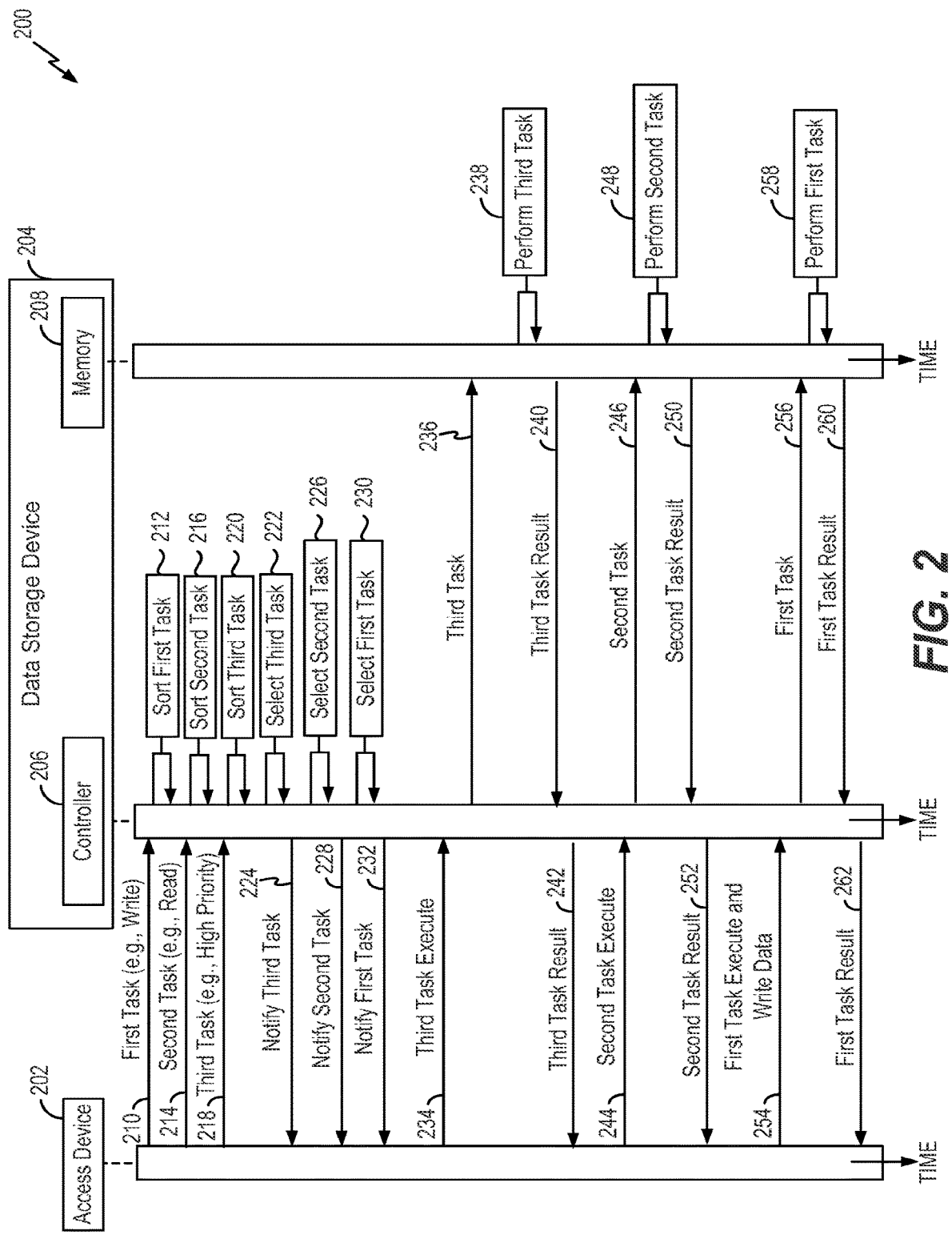
FIG. 2 is a ladder diagram illustrating communication between an access device and a data storage device.

Referring to FIG. 2, a first illustrative example of a method 200 of communicating between a representative access device 202 and a representative data storage device 204 is shown. The method 200 is illustrated by a ladder diagram. The access device 202 and the data storage device 204 may include or correspond to the access device 130 and the data storage device 102 of FIG. 1, respectively. The data storage device 204 may include a controller 206 and a memory 208. The controller 206 and the memory 208 may include or correspond to the controller 120 and the memory 104 of FIG. 1, respectively.

The access device 202 may send a first task to the data storage device 204, at 210. In the example illustrated in FIG. 2, the first task includes a write task. The first task may include or correspond to the task 134 of FIG. 1. In response to receiving the first task, the controller 206 may assign the first task to a first queue of multiple task queues of the data storage device 204, at 212. The multiple task queues may include or correspond to the multiple task queues 166 of FIG. 1. The first queue may be designated as a write task queue.

The access device 202 may send a second task to the data storage device 204, at 214. In the example illustrated in FIG. 2, the second task includes a read task. In response to receiving the second task, the controller 206 may assign the second task to a second queue of multiple task queues of the data storage device 204, at 216. The second queue may be designated as a read task queue. The access device 202 may send a third task to the data storage device 204, at 218. In the example illustrated in FIG. 2, the third task includes a high priority task. In response to receiving the third task, the controller 206 may assign the third task to a third queue of multiple task queues, at 220. The third queue may be designated as a high priority task queue.

The controller 206 may implement a selection scheme, such as the selection scheme 152 of FIG. 1, to determine a selection order of the multiple task queues. The controller 206 may select the third queue (e.g., the high priority queue) according to the selection scheme and may select the third task, at 222. In some implementations, the third task may be associated with a high priority write request. The controller 206 may notify the access device 202 that the third task has been selected, at 224.

After the third queue is selected, the controller 206 may select the second queue (e.g., the read queue) according to the selection scheme and may select the second task, at 226. The controller 206 may notify the access device 202 that the second task has been selected, at 228.

After the second queue is selected, the controller 206 may select the first queue (e.g., the write queue) according to the selection scheme. The controller 206 may select the first task, at 230, and may notify the access device 202 that the first task has been selected, at 232. An order in which tasks are selected from the multiple task queues (and/or an order in which the access device 202 is notified that tasks have been selected) may be associated with an order in which the tasks are to be processed (e.g., executed) by the data storage device 204. It is noted that a different selection scheme (other than the selection scheme described with reference to FIG. 2) may be used to select queues. For example, alternative selection schemes are described with reference to FIGS. 3 and 4.

After being notified that the third task has been selected, the access device 202 may send a third task execution command to the data storage device 204, at 234. Although the third execution command is illustrated as being sent after notification of the first task (at 232), the third execution command may be sent after the notification of the third task and prior to the notification of the second task (at 228) and/or prior to notification of the first task (at 232). The third task execution command may be associated with the third task. Based on the third task execution command, the controller 206 may send the third task to the memory 208, at 236, and the memory 208 may perform the third task, at 238. The memory 208 may send a third task result to the controller 206, at 240, and the controller 206 may send the third task result to the access device 202, at 242.

After being notified that the second task has been selected and after sending the third task execution command, the access device 202 may send a second task execution command to the data storage device 204, at 244.

The second task execution command may be associated with the second task. Based on the second task execution command, the controller 206 may send the second task to the memory 208, at 246, and the memory 208 may perform the second task (e.g., a read operation), at 248. The memory 208 may send a second task result (e.g., read data) to the controller 206, at 250, and the controller 206 may send the second task result to the access device 202, at 252.

After being notified that the first task has been selected and after sending the second task execution command, the access device 202 may send a first task execution command and write data to the data storage device 204, at 254. The first task execution command may be associated with the first task. Based on the first task execution command, the controller 206 may send the first task and the write data to the memory 208, at 256, and the memory 208 may perform the first task (e.g., a write operation), at 258. The memory 208 may send a first task result to the controller 206, at 260, and the controller 206 may send the first task result to the access device 202, at 262.

Although the method 200 illustrates three tasks being communicated and processed by the access device 202 and the data storage device 204, more than three tasks, fewer than three tasks, and/or different tasks may be communicated and processed by the access device 202 and the data storage device 204. Additionally, the order and/or timing of communications between the access device 202 and the data storage device 204 may be different than illustrated in FIG. 2. For example, notification of the third task (at 224) may occur after selection of the second task (at 226) and/or after selection of the first task (at 228). As another example, the third task execution command may be sent after notification of the third task (at 224) and prior to the second task execution command (at 244). As another example, the second task execution command may be sent after the third task execution command (at 234) and prior to the first task execution command (at 254).

By selecting tasks received from the access device 202 according to a selection scheme, the data storage device 204 may notify the access device 202 of an order in which the tasks are to be performed. Selection of the tasks and/or the order in which the tasks are to be performed may be based on the architecture of the data storage device 204. By basing the selection of the tasks and/or the order on the underlying architecture of the data storage device, the tasks may be organized and efficiently performed at the memory 208.

Figure 3:
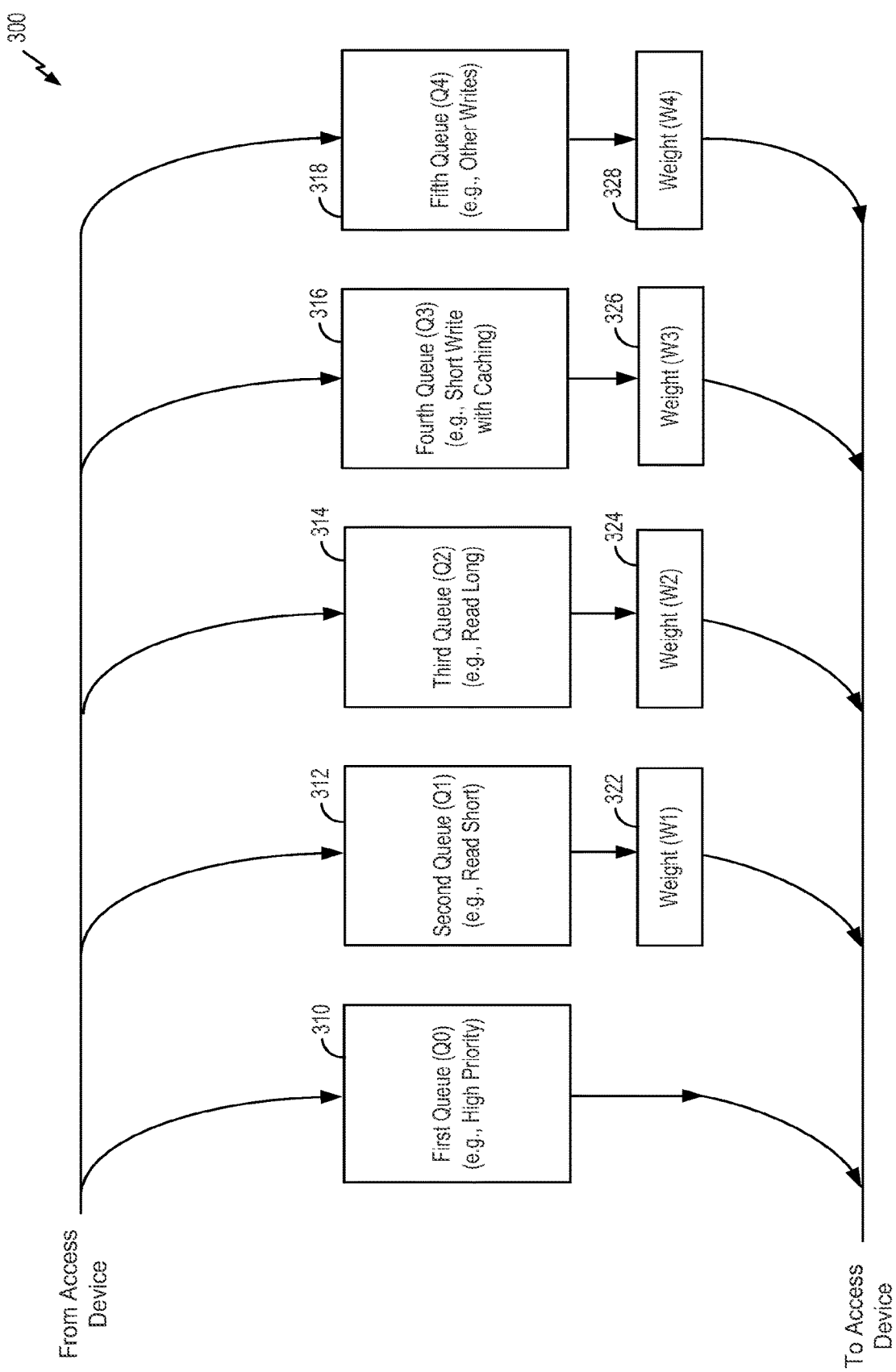
FIG. 3 is a diagram that illustrates an example of multiple task queues.

Referring to FIG. 3, an illustrative example of multiple task queues is depicted and generally designated 300. The multiple task queues 300 may include or correspond to the multiple task queues 166 of FIG. 1. The multiple task queues may be included in or coupled to a data storage device, such as the data storage device 102 of FIG. 1.

The multiple task queues 300 may be configured to receive tasks from an access device, such as the access device 130 of FIG. 1. The received tasks may be stored in the multiple task queues 300. For example, the received tasks may be assigned to the multiple task queues 300 as described with reference to the task scheduler module 160 (e.g., the task assignment module 162) of FIG. 1.

The received tasks may be selected from the multiple task queues 300 based at least in part on a selection scheme, such as the selection scheme 152 of FIG. 1. For example, the tasks may be selected from the multiple task queues 300 as described with reference to the task scheduler module 160 (e.g., the task selection module 168) of FIG. 1. An order in which the tasks are selected from the multiple task queues 300 may correspond to an order associated with execution of the tasks. One or more notifications may be sent to the access device to inform the access device of the order in which the tasks are selected from multiple task queues. Additionally or alternatively, a controller of the data storage device may receive the selected tasks and/or the one or more notifications.

The multiple task queues 300 may include a first queue (Q0) 310, a second queue (Q1) 312, a third queue (Q2) 314, a fourth queue (Q3) 316, and a fifth queue (Q4) 318. Each of the multiple task queues 300 may be associated with different tasks and/or different types of tasks. For example, the first queue (Q0) 310 may be a high priority queue, the second queue (Q1) 312 may be a short read queue, the third queue (Q2) 314 may be a long read queue, the fourth queue (Q3) 316 may be a short write with caching queue, and the fifth queue (Q4) 318 may be write queue for writes other than short writes with caching. Although the multiple task queues 300 are described as including five queues, the multiple task queues 300 may include more than or fewer than five queues, or different queues.

One or more of the multiple task queues 300 may be associated with a corresponding weight (e.g., a weight value), such as a weight value of the one or more weights 158 of FIG. 1. For example, the second queue (Q1) 312 may be associated with a first weight value (W1) 322, the third queue (Q2) 314 may be associated with a second weight value (W2) 324, the fourth queue (Q3) 316 may be associated with a third weight value (W3) 326, and the fifth queue (Q4) 318 may be associated with a fourth weight value (W4) 322. Each of the weight values 322-328 may be associated with a number of tasks that may be selected (e.g., consecutively selected) from a corresponding queue. For example, a number of tasks may be selected from a particular queue until the number of tasks selected is greater than or equal to a weight value of the particular queue or until the particular queue does not include any more tasks to be selected.

The first queue (Q0) 310 may not be associated with a weight value, and a number of tasks that may be consecutively selected from the first queue (Q0) 310 may not limited. In some implementations, when the first queue (Q0) 310 is selected, one or more tasks may be selected from the first queue (Q0) 310 until the first queue (Q0) 310 does not include any more tasks.

The selection scheme may be used to identify a sequence of queues of the multiple task queues 300 to be used to select one or more tasks from. In some implementations, the selection scheme may be cyclical (e.g. repeating) and may cycle through each queue of the multiple task queues 300. For example, a sequence of a cycle may be Q0-Q1-Q2-Q3-Q4.

In other implementations, the selection scheme may cycle through the multiple task queues 300 by alternating between a first set of one or more queues and a second set of one or more queues. For example, the multiple task queues 300 may include a first set of one or more queues and a second set of one or more queues. The first set of one or more queues may include the first queue (Q0) 310 and the second set of one or more queues may include the second queue (Q1) 312, the third queue (Q2) 314, the fourth queue (Q3) 316, and the fifth queue (Q4) 318. The selection scheme may alternate between the first set of one or more queues and the second set of one or more queues, and may be cyclical with respect to each of the first set of one or more queues and the second set of one or more queues. To illustrate, a sequence of a cycle of the selection scheme may be Q0-Q1-Q0-Q2-Q0-Q3-Q0-Q4. Accordingly, if the first set of one or more queues includes a single queue (e.g., a high priority queue), the selection scheme may identify the first queue (Q0) 310 (e.g., the high priority queue) to be used after each use of a queue from the second set of one or more queues. By frequently using the first queue (Q0) 310 (e.g., the high priority queue), a latency of execution of high priority tasks may be reduced as compared to if the first queue (Q0) 310 (e.g., the high priority queue) were used less often.

In some implementations, when cycling through the second set of one or more queues, the second queue (Q1) 312 (e.g., the short read queue) and the fourth queue (Q3) 316 (e.g., the short write queue) may be selected to be used multiple times in each cycle, such as two times in a row. To illustrate, a sequence of a cycle of the selection scheme may be Q0-Q1-Q0-Q1-Q0-Q2-Q0-Q3-Q0-Q3-Q0-Q4.

If the first set of one or more queues were to include another queue (Q5) (not illustrated), a sequence of a cycle of the selection scheme may be Q0-Q1-Q5-Q2-Q0-Q3-Q5-Q4. In other implementations, the other queue (Q5) may be included in the second set of one or more queues. For example, the other queue (Q5) may be a protocol queue, as described with reference to FIG. 1. An example of a sequence of a cycle when the second set of one or more queues includes the other queue (Q5) may be Q0-Q1-Q0-Q2-Q0-Q3-Q0-Q4-Q0-Q5. It is noted that the sequences of cycles of the selection scheme described herein are for illustrative purposes and that other sequences may be used based on a number of queues of the multiple task queues 300 and/or based on a division of multiple task queues into two or more sets of queues.

In some implementations, when a particular queue is being used to select a group of one or more tasks, the first queue (Q0) 310 may be checked to determine whether the first queue (Q0) includes any tasks in response to a task being selected from the particular queue. To illustrate, the particular queue, such as the second queue (Q1) 312, may be associated with a weight value of four. The particular queue may be selected to be used and a first task may be selected from the particular queue. A count value of tasks selected from the particular queue may be incremented and the count value may be compared to the weight value. In association with a comparison between the count value and the weight value, the first queue (Q0) 310 may be checked to determine whether the first queue (Q0) includes any tasks. For example, the first queue (Q0) may be checked before, during, and/or after the comparison. If the first queue (Q0) 310 includes at least one tasks, one or more tasks may be selected from the first queue (Q0) 310. When the first queue (Q0) 310 includes no task, task selection may be determined based on an outcome of the comparison the count value to the weight value. For example, if the count value is less than the weight value, another task may be selected from the particular queue. If the count value is equal to the weight value, a next queue may be selected.

Thus, FIG. 3 provides a first example of multiple task queues and operation of a selection scheme. By selecting tasks from the multiple task queues 300 according to the selection scheme, tasks may be organized and efficiently performed at the memory of the data storage device.

Figure 4:
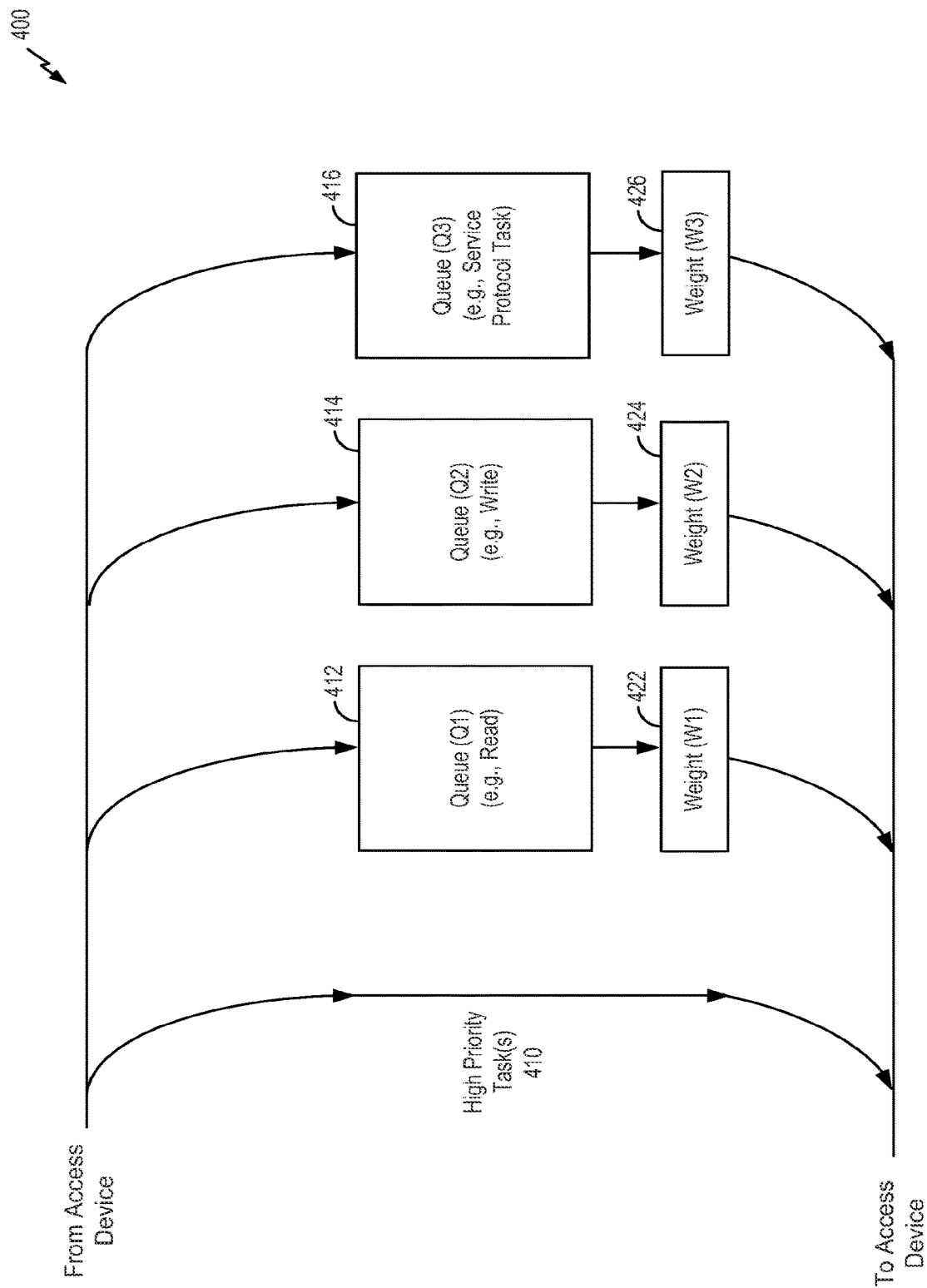
FIG. 4 is a diagram that illustrates another example of multiple task queues.

Referring to FIG. 4, an illustrative example of multiple task queues is depicted and generally designated 400. The multiple task queues 400 may include or correspond to the multiple task queues 166 of FIG. 1 or the multiple task queues 300 of FIG. 3. The multiple task queues may be included in or coupled to a data storage device, such as the data storage device 102 of FIG. 1.

The multiple task queues 400 may be configured to receive tasks from an access device, such as the access device 130 of FIG. 1. The received tasks may be stored to the multiple task queues 400. For example, the received tasks may be assigned to the multiple task queues 400 as described with reference to the task scheduler module 160 (e.g., the task assignment module 162) of FIG. 1.

The received tasks may be selected from the multiple task queues 400 based at least in part on a selection scheme, such as the selection scheme 152 of FIG. 1. For example, the tasks may be selected from the multiple task queues 400 as described with reference to the task scheduler module 160 (e.g., the task selection module 168) of FIG. 1. An order in which the tasks are selected from the multiple task queues 400 may correspond to an order associated with execution of the tasks. One or more notifications may be sent to the access device to inform the access device of the order in which the tasks are selected from multiple task queues. Additionally or alternatively, a controller of the data storage device may receive the selected tasks and/or the one or more notifications.

In the example illustrated in FIG. 4, multiple task queues 400 may include a first queue (Q1) 412, a second queue (Q2) 414, and a third queue (Q3) 416. In this example, the first queue (Q1) 412 may be a read queue, the second queue (Q2) 414 may be a write queue, the third queue (Q3) 416 may be a protocol queue (e.g., a protocol-based queue), such as a service protocol queue. The third queue (Q3) 416 may be configured to receive tasks associated with a particular protocol type. For example, a particular task may include a field having information that indicates a protocol type of the task (e.g., a protocol used to generate and/or format the particular task). It is noted that the multiple task queues 400 are configured such that a high priority task(s) 410 is not received by a queue. Accordingly, when a high priority task(s) 410 is received, the high priority task(s) 410 may be selected irrespective of a selection sequence (e.g., a queue selection sequence and/or a task selection sequence) applied to the multiple task queues 400. To illustrate, a task received from the access device may be automatically selected (e.g., rather than being assigned to a queue) in response to a determination that the task is a high priority task. Although the multiple task queues 400 are described as including three queues, the multiple task queues 400 may include more than or fewer than three queues, and/or different types of queues.

In some implementations, each task identified as being associated with a particular protocol type may be assigned to the third queue (Q3), regardless of whether or not the task is a high priority task. In other implementations, high priority tasks associated with the particular protocol type may not be assigned to the third queue (Q3) 416.

One or more of the multiple task queues 400 may be associated with a corresponding weight (e.g., a weight value), such a weight value of the one or more weights 158 of FIG. 1. For example, the first queue (Q1) 412 may be associated with a first weight value (W1) 422, the second queue (Q2) 414 may be associated with a second weight value (W2) 424, and the third queue (Q3) 416 may be associated with a third weight value (W3) 426. Each of the weight values 422-426 may be associated with a number of tasks that may be selected (e.g., consecutively selected) from a corresponding queue.

The selection scheme may be used to identify a queue of the multiple task queues 400 from which one or more tasks are selected. The selection scheme may be applied to the multiple task queues 400 in accordance with the selection scheme(s) applied to the multiple task queues 300 of FIG. 3.

Thus, FIG. 4 provides another example of multiple task queues and operation of a selection scheme. By selecting tasks from the multiple task queues 400 according to the selection scheme, tasks may be organized and efficiently performed at the memory of the data storage device.

Figure 5:
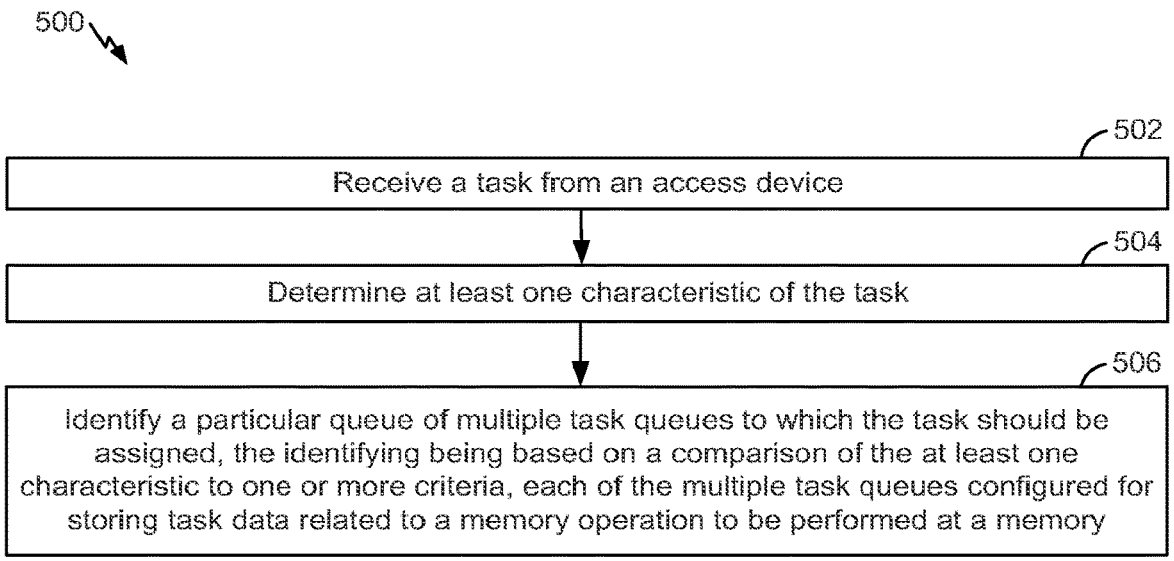
FIG. 5 is a flow diagram that illustrates an example of a first method of operation of the data storage device of FIG. 1.

Referring to FIG. 5, a particular illustrative example of a method is depicted and generally designated 500. The method 500 may be performed at a device, such as the data storage device 102, the access device 130 of FIG. 1, the data storage device 204, or the access device 202 of FIG. 2. For example, the method 500 may be performed by the data storage device 102, such as by the controller 120, the task scheduler module 160, the task assignment module 162, a processor or circuitry configured to execute instructions (e.g., firmware), or a combination thereof, as illustrative, non-limiting examples.

The method 500 includes receiving a task from an access device, at 502. For example, the task may include the task 134 of FIG. 1 or one of the tasks described at 210, 214, 218 of FIG. 2. The access device may include the access device 130 of FIG. 1 or the access device 202 of FIG. 2. The task may be associated with a command and/or a request from the access device to be performed by the data storage device. For example, the task may be associated with an operation to be performed at a memory (e.g., the memory 104) of the data storage device.

The method 500 includes determining at least one characteristic of the task, at 504. The at least one characteristic may include a task identifier (ID) assigned by the access device 130, a write operation, a read operation, a high priority operation, an address (e.g., a data start memory address), a data size, a protocol, or a combination thereof. The task may include one or more fields that include data that indicate the at least one characteristic. In some implementations, a parsing module may be configured to parse the task to identify the at least one characteristic (e.g., to identify the data included in the one or more fields).

The method 500 also includes identifying a particular queue of multiple task queues to which the task should be assigned, the identifying being based on a comparison of the at least one characteristic to one or more criteria, at 506. For each queue, the one or more criteria may define tasks to be stored at the queue. As an illustrative, non-limiting example, criteria for a particular queue may indicate an address, a data size, a protocol, and/or an operation type associated with tasks to be included in the particular queue. Each of the multiple task queues may be configured for storing task data related to a memory operation to be performed at a memory. The multiple task queues may include the multiple task queues 166 of FIG. 1, the queues 310-318 of FIG. 3, or the queues 412-416 of FIG. 4. The one or more criteria may include the one or more criteria 159 of FIG. 1.

In some implementations, the method 500 may include assigning the task to the particular queue. Assignment of the task to the particular queue may enable scheduling of the task. For example, the assignment of the task to the particular queue may enable selection of the task according to a prioritization (e.g., a selection scheme) of the multiple task queues.

In some implementations, prior to receiving the first task, the method 500 may include accessing one or more parameters, such as the parameters 154 of FIG. 1, stored at the data storage device and determining a number of queues to be included in the multiple task queues based on the one or more parameters. For example, the one or more parameters may indicate the number of queues. Multiple task queues may be created based on the determined number of task queues. For example, each of the queues of the multiple task queues may be created (e.g., established) in a second memory of the data storage device, such as a memory of a controller of the data storage device. The second memory may include the second memory 150 of FIG. 1. Each queue of the multiple task queues may be established by designating a corresponding portion of the second memory to be used as the queue. The one or more parameters may include or be based on architectural parameters of the data storage device. For example, the architectural parameters may include or be based on a number of dies included in the memory, a width of a data bus coupled to the controller and to the memory, a size of a data buffer (e.g., the data buffer 182 of FIG. 1) of the controller, or a combination thereof, as illustrative, non-limiting examples.

Additionally, prior to receiving the task, the method 500 may include determining a weight value to be applied to a particular queue of the multiple task queues. For example, one or more of the parameters may indicate the weight value. The weight value may include or be associated with the one or more weights 158 of FIG. 1, one of the weight values 322-328 of FIG. 3, or one of the weight values 422-426 of FIG. 4. The weight value may be assigned to the particular queue and may indicate a number of tasks that may be consecutively retrieved from the particular queue.

In some implementations, die availability information may be received from the memory, such as the memory 104 of FIG. 1. Based on the die availability information, at least one parameter of the one or more parameters may be modified. For example, the at least one parameter may be associated with a weight value assigned to a particular queue of the multiple task queues. After modifying the at least one parameter, the weight value assigned to the particular queue may be modified based on the at least one parameter.

The multiple task queues may include a queue designated as a first read queue and a queue designated as a first write queue. Additionally or alternatively, the multiple task queues may include a queue that is designated as a high priority queue that is configured to receive high priority tasks. In some implementations, the multiple task queues may include a queue that is designated as a second read queue. The first read queue may be configured to receive a first read task to read a first amount of data that is less than or equal to a read threshold, and the second read queue may be configured to receive a second read task to read a second amount of data that is greater than the read threshold. The read threshold may be included in or determined based on the one or more criteria, such as the one or more criteria 159 of FIG. 1. The read threshold may be based on a page size read from the memory, such as the memory 104 of FIG. 1 or the memory 208 of FIG. 2, during a read access operation.

Additionally or alternatively, the multiple task queues may include a queue that is designated as a second write queue. The first write queue may be configured to receive a first write task to write a first amount of data that is less than or equal to a write threshold, and the second write queue may be configured to receive a second write task to write a second amount of data that is greater than the write threshold. The write threshold may be included in or determined based on the one or more criteria. The write threshold may be based on a page size written to the memory during a write access operation.

In some implementations, the method 500 may include receiving a second task from the access device. The first task may be determined to be associated with a first protocol that is different than a second protocol associated with the second task. For example, the first protocol may be a standardized protocol, and the second protocol may be a service protocol, such as a non-standardized proprietary protocol. A queue may be established (e.g., created) that is included in the multiple task queues as a distinct queue and that is designated as a second protocol task queue. The second protocol task queue may be configured to receive tasks (e.g., read tasks, write task, or other tasks) associated with the second protocol.

Thus, FIG. 5 provides an example of assigning a task to one of multiple task queues. By assigning the task to the multiple task queues, tasks may be organized and efficiently performed at the memory of the data storage device.

Figure 6:
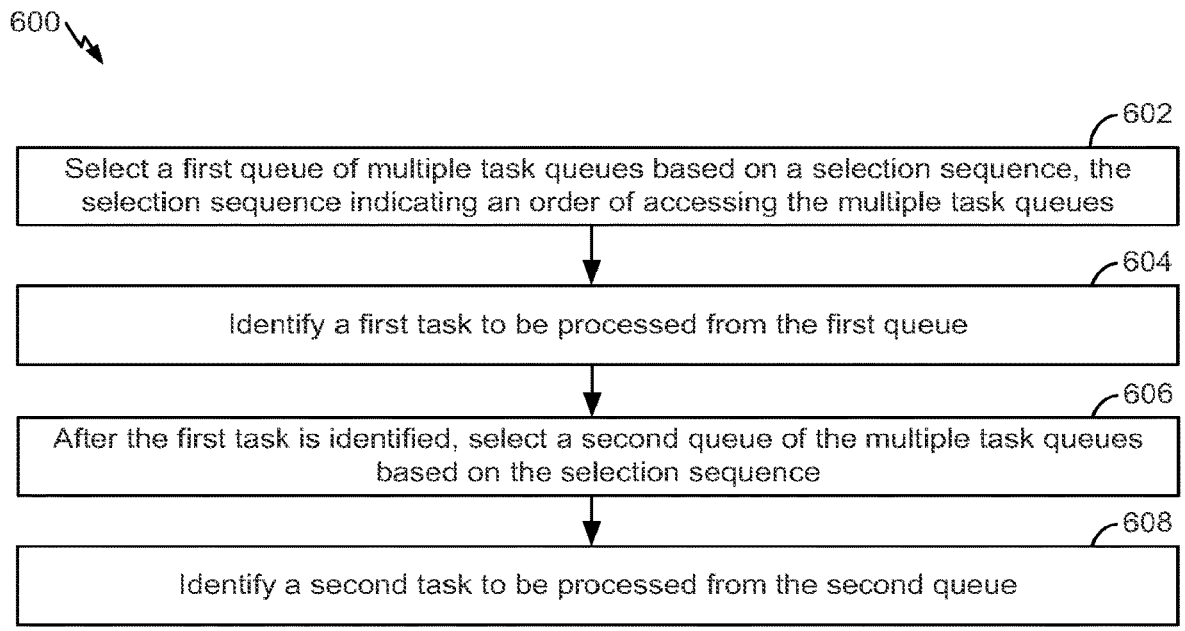
FIG. 6 is a flow diagram that illustrates an example of a second method of operation of the data storage device of FIG. 1.

Referring to FIG. 6, a particular illustrative example of a method is depicted and generally designated 600. The method 600 may be performed at a device, such as the data storage device 102, the access device 130 of FIG. 1, the data storage device 204, or the access device 202 of FIG. 2. For example, the method 600 may be performed by the data storage device 102, such as by the controller 120, the task scheduler module 160, the task selection module 168, a processor or circuitry configured to execute firmware, or a combination thereof, as illustrative, non-limiting examples.

The method 600 includes selecting a first queue of multiple task queues based on a selection sequence, the selection sequence indicating an order of accessing the multiple task queues, at 602. For example, the multiple task queues may include or correspond to the multiple task queues 166 of FIG. 1, the queues 310-318 of FIG. 3, or the queues 412-416 of FIG. 4. The multiple task queues may be configured based on one or more architectural aspects of a data storage device. To illustrate, a number of queues of the multiple task queues may be based on one or more parameters, and the one or more parameters may be based on the one or more architectural aspects. In a particular example, the one or more architectural aspects are associated with a number of dies included in the memory, a width of a data bus coupled to the controller and to the memory, and/or a size of a data buffer of the controller, as illustrative, non-limiting examples. To illustrate, with reference to FIG. 1, the one or more architectural aspects may be associated with a number of the one or more memory dies 103 included in the memory 104, a width of the data bus 106 coupled to the controller 120 and to the memory 104, and/or a size of the data buffer 182 of the controller 120. In some implementations, the multiple task queues may be included in a controller of the data storage device. The selection sequence may include the selection scheme 152 of FIG. 1.

The method 600 also includes identifying a first task to be processed from the first queue, at 604. The first task may include or corresponds to the selected task 192 of FIG. 1.

The method 600 also includes, after identifying the first task, selecting a second queue of the multiple task queues based on the selection sequence, at 606, and identifying a second task to be processed from the second queue, at 608. Each task identified (e.g., selected) from the multiple task queues may be included in a task order, such as the task order 194 of FIG. 1. The task order may indicate an order in which one or more tasks are to be executed by the data storage device. The order in which the one or more tasks are to be executed may correspond to an order in which the one or more tasks are selected from the multiple task queues. An access device may be notified of the order in which the one or more tasks are selected from the multiple task queues. For example, a copy of the task order may be sent from the data storage device to the access device.

The selection sequence may be configured to alternate between identification of a next queue as one of a first set of queues of the multiple task queues and identification of the next queue as one of a second set of queues multiple task queues. For example, the first set of queues may include the first queue and/or the second queue. In some implementations, the second set of queues may include a single queue that is designated as high priority queue. In a particular implementation, the first set of queues may include a single queue. In some implementations, each time the second set of queues is used to identify a particular next queue, the selection sequence may identify a different queue of the second set of queues than a previous queue selected from the second set of queues. Additionally or alternatively, the first set of queues may be configured to receive first tasks associated with a first protocol (e.g., a standardized protocol) and the second set of queues may be configured to receive second tasks associated with a second protocol (e.g., a service protocol, such as a non-standardized protocol and/or a proprietary protocol) that is different than the first protocol.

In some implementations, prior to selecting the first task, the first task and the second task are received at the data storage device from an access device, such as the access device 130 of FIG. 1 or the access device 202 of FIG. 2. To illustrate, the first task and the second task may be received via an interface of the data storage device. The interface may include or correspond to the access device interface 108 of FIG. 1. The first task may be received at the data storage device before or after the second task is received at the data storage device and may be assigned to a queue by a task assignment module, such as the task assignment module 162 of FIG. 1.

In response to selecting the first task (and/or the second task), a task list may be updated to indicate that the first task (and/or the second task) has been selected to be processed. For example, the task list may include the task order 194 stored in the second memory 150 of the controller 120 of FIG. 1.

In some implementations, the method 600 may include sending a notification that one or more tasks have been selected to an access device that generated the one or more tasks. For example, the notification may include that the first task has been selected. Responsive to the notification, one or more execution commands, such as the execute command 136 of FIG. 1, may be received from the access device. For example, if the notification indicates that the first task and the second task were selected, a first execution command associated with the first task and a second execution command associated with the second task may be received.

In response to the first execution command, the first task may be executed. For example, in response to the first execution command, a memory access operation may be initiated to perform a memory access operation associated with the first task. To illustrate, the method 600 may include processing tasks selected from the multiple task queues to be performed, according to an order in which the tasks are selected, as memory access operations. The memory access operation may be performed by the memory, such as the memory 104 of FIG. 1, of the data storage device. The memory may include a three-dimensional (3D) memory configuration that is monolithically formed in one or more physical levels of arrays of memory cells having an active area disposed above a silicon substrate and may include circuitry associated with operation of the memory cells. The memory access operation may correspond to the first task that may be performed at the memory.

In some implementations, the memory may include multiple dies, such as the memory dies 103 of FIG. 1. A memory access operation performed by the memory may concurrently execute multiple tasks, such as multiple tasks selected from the same queue. For example, the second task may be selected from the second queue and a next task selected after the second task may include a third task selected from the second queue. One or more notifications may be provided to the access device to indicate the second task was selected and the third task was selected. One or more execution commands for each of the second task and the third task may be received from the access device. Responsive to the one or more execution commands, a memory access operation may perform the second task at a first die of the multiple dies and may perform the third task at a second die of the multiple dies.

In some implementations, the second queue may be associated with a weight value that indicates a threshold number of consecutive tasks selectable from the second queue. The weight value may be based on the one or more architectural aspects of the data storage device. Based on selection of the second task, a value of a counter associated with a number of tasks consecutively selected from the second queue may be incremented. The value of the counter may be compared to the weight value. In response to determining that the value of the counter is greater than the weight value, the value of the counter may be reset to an initial value and a next queue of the multiple task queues may be selected. In response to determining that the value of the counter is less than or equal to the weight value, a determination may be made whether the second queue includes at least one task and, in response to determining that the second queue includes the at least one task, another task (e.g., a third task) may be selected from the second queue. Alternatively, in response to determining that the second queue does not include the at least one task, a next queue may be selected (and the counter value may be reset). In some implementations, the next queue may be the first queue and the first queue may be a high priority queue.

In some implementations, a first consecutive number of tasks may be selected from the second queue according to a weight value of the second queue. After the first consecutive number of tasks is selected, the memory, such as the memory 104, may generate die availability information and provide the die availability information to a controller, such as the controller 120, of the data storage device. The weight value of the second queue may be updated based on the die availability information, and a second consecutive number of tasks may be selected from the second queue according to the updated weight value.

In some implementations, prior to selection (e.g., removal) of the second task, the second task (or a task identifier of the second task) may be read from the second queue as a next task to be selected and a target die associated with the second task may be identified. A determination may be made whether the target die is available. For example, the determination may be made based on the die availability information generated by the memory. In response to determining that the target die is unavailable, selection (e.g., removal) of the second task may be delayed. Each queue of the multiple task queues may be configured to operate as a first-in, first-out (FIFO) buffer.

In some implementations, the method 600 may include determining whether one or more high priority tasks have been received. For example, determining whether the one or more high priority tasks have been received may be performed after selecting the second task. In response to determining that the one or more high priority tasks have been received, the one or more high priority tasks may be selected, and an access device that generated the one or more high priority tasks may be notified that the one or more high priority tasks have been selected. A next queue may be selected based on the selection sequence in response to determining that no additional high priority tasks are available to be selected.

Thus, FIG. 6 provides an example of selecting tasks from multiple task queues. By selecting tasks from the multiple task queues (according to the selection scheme), tasks may be efficiently performed at the memory of the data storage device.

Figure 7:
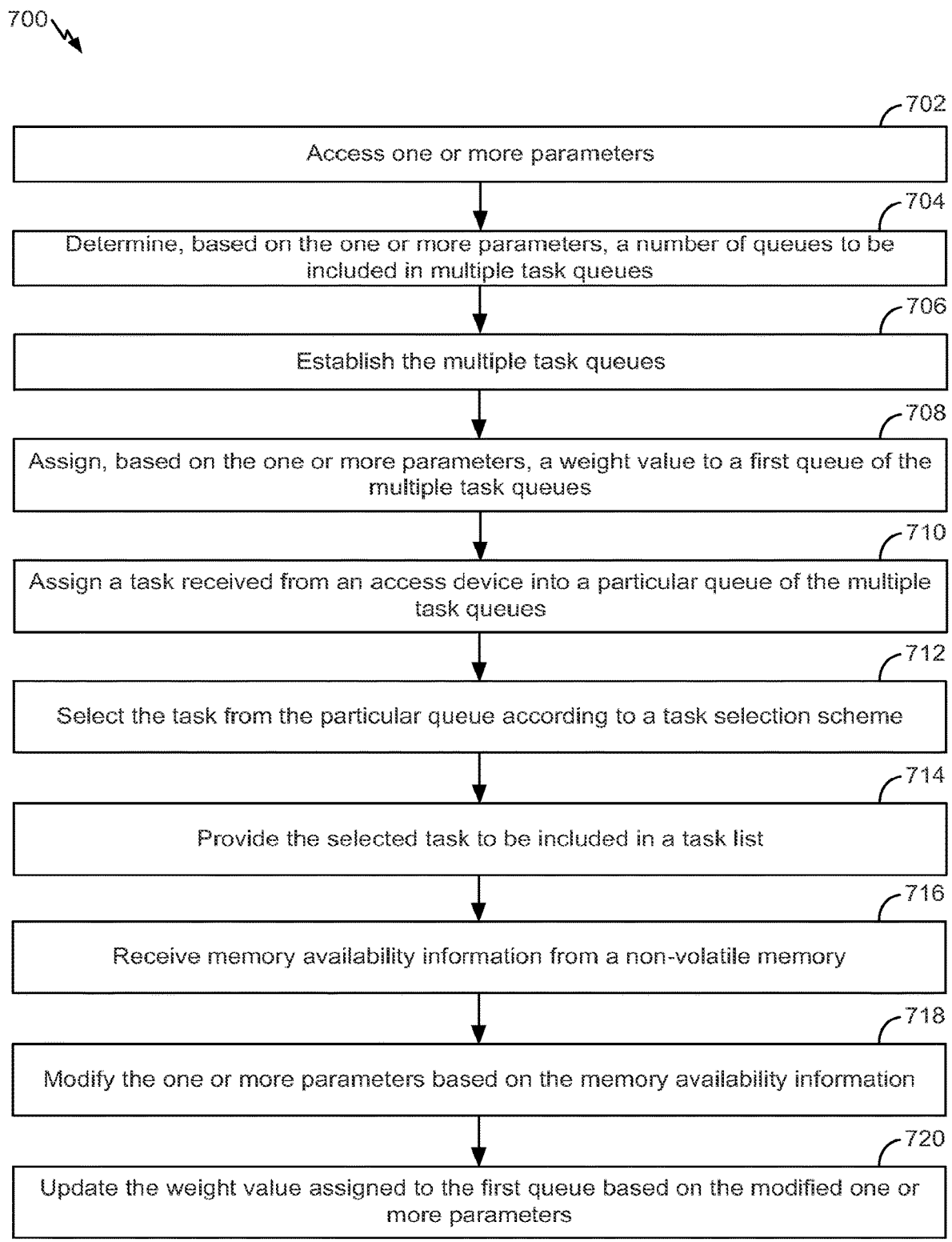
FIG. 7 is a flow diagram that illustrates an example of a third method of operation of the data storage device of FIG. 1.

Referring to FIG. 7, a particular illustrative example of a method is depicted and generally designated 700. The method 700 may be performed at a device, such as the data storage device 102, the access device 130 of FIG. 1, the data storage device 204, and/or the access device 202 of FIG. 2. For example, the method 700 may be performed by the data storage device 102, such as by the controller 120, the task assignment module 162, the task scheduler module 160, the task selection module 168, a processor or circuitry configured to execute firmware, or a combination thereof, as illustrative, non-limiting examples.

The method 700 may include accessing one or more parameters, at 702. The one or more parameters may be stored in a memory, such as the second memory 150 of FIG. 1, of the data storage device and may include a number of queues to be used, one or more weight values associated with the multiple task queues, and one or more criteria to be used to assign tasks to different queues. The one or more parameters may include the one or more parameters 154 of FIG. 1. The method 700 further includes determining, based on the one or more parameters, a number of queues to be included in multiple task queues, at 704. The multiple task queues may include or correspond to the multiple task queues 166 of FIG. 1, the queues 310-318 of FIG. 3, or the queues 412-416 of FIG. 4.

The method 700 may include establishing the multiple task queues, at 706. For example, the multiple task queues may be established by partitioning a particular memory into portions. The particular memory may include or correspond to the memory 104, the one or more of the memory dies 103, the second memory 150 of FIG. 1, or the memory 208 of FIG. 2. Each portion may correspond to a different queue of the multiple task queues. For example, a first portion of the particular memory may correspond to a first queue (e.g., a read queue), a second portion of the particular memory may correspond to a second queue (e.g., a write queue), and a third portion of the particular memory may correspond to a third queue (e.g., a high priority queue), as an illustrative, non-limiting example.

The method 700 may further include assigning, based on the one or more parameters, a weight value to a first queue of the multiple task queues, at 708. For example, a weight value of eight may be assigned to the first queue (e.g., a read queue). The weight value may include or be associated with the one or more weights 158 of FIG. 1, one of the weight values 322-328 of FIG. 3, or one of the weight values 422-426 of FIG. 4.

The method 700 may include assigning (e.g., storing data identifying) a task into a particular queue of the multiple task queues, at 710. For example, referring to FIG. 1, the task 134 may be assigned to one of the multiple task queues 166 as the assigned task 190. The method 700 may also include selecting the task from the particular queue, at 712, and providing the selected task to be included in a task list, at 714. For example, the task list may include or correspond to the task order 194 stored in the second memory 150 of the controller 120 of FIG. 1.

The method 700 may include receiving die availability information from a non-volatile memory, at 716, and modifying the one or more parameters based on the memory availability information, at 718. The die availability information may include or correspond to the die availability information 138 of FIG. 1. The method 700 may also include updating the weight value assigned to the first queue based on the modified on or more parameters, at 720.

Thus, FIG. 7 provides an example of configuring multiple task queues and using multiple task queues to receive assigned tasks and to select tasks for execution. By assigning tasks to the multiple task queues and/or by selecting (e.g. according to the selection scheme) tasks from the multiple task queues, tasks may be organized and efficiently performed at the memory of the data storage device.

The method 200 of FIG. 2, the method 500 of FIG. 5, the method 600 of FIG. 6, and/or the method 700 of FIG. 7, or portions thereof, may be initiated or controlled by an application-specific integrated circuit (ASIC), a processing unit, such as a central processing unit (CPU), a controller, another hardware device, a firmware device, a field-programmable gate array (FPGA) device, or any combination thereof. As an example, the method 200 of FIG. 2, the method 500 of FIG. 5, the method 600 of FIG. 6, and/or the method 700 of FIG. 7, or portions thereof, can be initiated or controlled by one or more processors, such as one or more processors included in or coupled to a controller or a memory of the data storage device 102, the access device 130 of FIG. 1, the data storage device 204 and/or the access device 202 of FIG. 2.

Although various components of the data storage device 102, the access device 130 of FIG. 1, the data storage device 204 and/or the access device 202 of FIG. 2 are depicted herein as block components and described in general terms, such components may include one or more microprocessors, state machines, or other circuits configured to enable the various components to perform operations described herein. One or more aspects of the various components may be implemented using a microprocessor or microcontroller programmed to perform operations described herein, such as one or more operations of the method 200 of FIG. 2, the method 500 of FIG. 5, the method 600 of FIG. 6, and/or the method 700 of FIG. 7. In a particular implementation, each of the controller 120, the memory 104, the second memory 150, the access device 130 of FIG. 1, the controller 206, the memory 208, and/or the access device 202 of FIG. 2 includes a processor executing instructions that are stored at a memory, such as a non-volatile memory of the data storage device 102, the access device 130 of FIG. 1, the data storage device 204, and/or the access device 202 of FIG. 2. Alternatively or additionally, executable instructions that are executed by the processor may be stored at a separate memory location that is not part of the non-volatile memory, such as at a read-only memory (ROM) of the data storage device 102, the access device 130 of FIG. 1, the data storage device 204, or the access device 202 of FIG. 2.

With reference to FIG. 1, the data storage device 102 may be attached to or embedded within one or more access devices, such as within a housing of an access communication device (e.g., the access device 130). For example, the data storage device 102 may be integrated within an apparatus, such as a mobile telephone, a computer (e.g., a laptop, a tablet, or a notebook computer), a music player, a video player, a gaming device or console, an electronic book reader, a personal digital assistant (PDA), a portable navigation device, or other device that uses non-volatile memory. However, in other aspects, the data storage device 102 may be implemented in a portable device configured to be selectively coupled to one or more external access devices. In still other aspects, the data storage device 102 may be a component (e.g., a solid-state drive (SSD)) of a network accessible data storage system, such as an enterprise data system, a network-attached storage system, a cloud data storage system, etc.

To further illustrate, the data storage device 102 may be configured to be coupled to the access device 130 as embedded memory, such as in connection with an embedded MultiMedia Card (eMMC®) (trademark of JEDEC Solid State Technology Association, Arlington, Va.) configuration, as an illustrative example. The data storage device 102 may correspond to an eMMC device. As another example, the data storage device 102 may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). The data storage device 102 may operate in compliance with a JEDEC industry specification. For example, the data storage device 102 may operate in compliance with a JEDEC eMMC specification, a JEDEC Universal Flash Storage (UFS) specification, one or more other specifications, or a combination thereof. In yet another particular aspect, the data storage device 102 is coupled to the access device 130 (e.g., an accessing device) indirectly, e.g., via a network. For example, the data storage device 102 may be a network-attached storage (NAS) device or a component (e.g. a solid-state drive (SSD) device) of a data center storage system, an enterprise storage system, or a storage area network.

The memory 104, the one or more memory dies 103, the second memory 150 of FIG. 1, and/or the memory 208 of FIG. 2 may include a resistive random access memory (ReRAM), a three-dimensional (3D) memory, a flash memory (e.g., a NAND memory, a NOR memory, a single-level cell (SLC) flash memory, a multi-level cell (MLC) flash memory, a divided bit-line NOR (DINOR) memory, an AND memory, a high capacitive coupling ratio (HiCR) device, an asymmetrical contactless transistor (ACT) device, or another flash memory), an erasable programmable read-only memory (EPROM), an electrically-erasable programmable read-only memory (EEPROM), a read-only memory (ROM), a one-time programmable memory (OTP), or a combination thereof. Alternatively, or in addition, the memory 104, the one or more of the memory dies 103, the second memory 150 of FIG. 1, and/or the memory 208 of FIG. 2 may include another type of memory. The memory 104, one or more of the memory dies 103, the second memory 150 of FIG. 1, and/or the memory 208 of FIG. 2 may include a semiconductor memory device.

Semiconductor memory devices include volatile memory devices, such as dynamic random access memory ("DRAM") or static random access memory ("SRAM") devices, non-volatile memory devices, such as magnetoresistive random access memory ("MRAM"), resistive random access memory ("ReRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of a non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor material such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Alternatively, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically used for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this disclosure is not limited to the two dimensional and three dimensional illustrative structures described but cover all relevant memory structures within the scope of the disclosure as described herein and as understood by one of skill in the art. The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Those of skill in the art will recognize that such modifications are within the scope of the present disclosure.

The above-disclosed subject matter is to be considered illustrative, and not restrictive, and the appended claims are intended to cover all such modifications, enhancements, and other embodiments, that fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage device configured to be coupled to an access device, comprising:
   a non-volatile memory; and
   a controller connected to the non-volatile memory, wherein the controller comprises:
      a controller memory configured to store instructions;
      a task scheduler module within the controller; and
      a processor connected to the controller memory,
   the controller configured to:
      determine multiple task queues based on one or more architectural aspects of the memory, the controller, or a combination thereof,
      receive a plurality of tasks, each task comprising an instruction, a command, or a request from the access device,
      assign a particular task of the plurality of tasks into one of the multiple task queues based upon a protocol type of the particular task,
      select a first queue of the multiple task queues within the task scheduler module based on a selection scheme,
      identify a first task to be processed from the first queue,
      select a second queue of the multiple task queues based on the selection scheme, and
      identify a second task to be processed from the second queue after the first task is identified,
      wherein the multiple task queues comprises a plurality of protocol-based queues,
      wherein the selection scheme comprises selecting based on a weight value, wherein the selection scheme further comprises alternating between the first queue and a set of queues, the set of queues comprising the second queue, a third queue, and a fourth queue, and wherein the selection scheme is cyclical with respect to the set of queues,
      wherein the weight value is a number of tasks that may be concurrently executed or consecutively selected, and
      wherein the one or more architectural aspects comprises a number of dies in the memory, a width of a data bus coupled to the memory and the controller, a size of a data buffer in the controller, or a combination thereof.

2. The data storage device according to claim 1, further comprising:
   an execution module within the controller, wherein the execution module is configured to read one of the first task and the second task and execute the one of the first task and the second task.

3. The data storage device according to claim 1, further comprising:
   a data buffer within the controller, the data buffer configured to store user data and allow for retrieval of the user data.

4. The data storage device according to claim 1, wherein the controller memory further comprises:
   an arrangement to store the selection scheme to indicate an order in which the task queues are selected.

5. The data storage device according to claim 1, wherein the task scheduler module further comprises:
   a queue that comprises the second queue, the third queue, and the fourth queue.

6. The data storage device according to claim 5, wherein the task scheduler module further comprises:
   a task assignment module connected to the controller memory, wherein the task assignment module is configured to assign tasks to the first queue and the set of queues.

7. The data storage device according to claim 6, wherein the task assignment module is further configured with a parse module.

8. A data storage device configured to be coupled to an access device, comprising:
   a non-volatile memory with at least two memory dies and a first interface; and
   a controller with a second interface, the controller connected to the non-volatile memory through the first interface and the second interface, wherein the controller comprises:
      a controller memory configured to store instructions;
      a task scheduler module within the controller; and
      a processor connected to the controller memory,
   the controller configured to:
      determine multiple task queues based on one or more architectural aspects of the memory, the controller, or a combination thereof,
      receive a plurality of tasks, each task comprising an instruction, a command, or a request from the access device,
      assign a particular task of the plurality of tasks into one of the multiple task queues based upon a protocol type of the particular task,
      select a first queue of the multiple task queues within the task scheduler module based on a selection scheme,
      identify a first task to be processed from the first queue,
      select a second queue of the multiple task queues based on the selection scheme, and
      identify a second task to be processed from the second queue after the first task is identified,
      wherein the multiple task queues comprises a plurality of protocol-based queues,
      wherein the selection scheme comprises selecting based on a weight value, wherein the selection scheme further comprises alternating between the first queue and a set of queues, the set of queues comprising the second queue, a third queue, and a fourth queue, and wherein the selection scheme is cyclical with respect to the set of queues,
      wherein the weight value is a number of tasks that may be concurrently executed or consecutively selected, and
      wherein the one or more architectural aspects comprises a number of dies in the memory, a width of a data bus coupled to the memory and the controller, a size of a data buffer in the controller, or a combination thereof.

9. The data storage device according to claim 8, wherein the controller further comprises:
   an execution module configured to read one of the first task and the second task and execute the one of the first task and the second task.

10. The data storage device according to claim 8, wherein the controller further comprises:
    a data buffer configured to store user data and allow for retrieval of the user data.

11. The data storage device according to claim 8, wherein the controller memory is further comprises:

an arrangement to store the selection scheme to indicate an order in which the task queues are selected.

12. The data storage device according to claim 8, wherein the task scheduler module further comprises:
a queue that comprises the second queue, the third queue, and the fourth queue.

13. The data storage device according to claim 12, wherein the task scheduler module further comprises:
a task assignment module connected to the controller memory, wherein the task assignment module is configured to assign tasks to the first queue and the set of queues.

14. The data storage device according to claim 13, wherein the task assignment module is further configured with a parse module.

15. A data storage device configured to be coupled to an access device, comprising:
an access device interface configured to allow a connection of an access device to the data storage device to allow data to be transferred to and from the data storage device;
a non-volatile memory configured to store data, the non-volatile memory configured with at least two memory dies and a first interface; and
a controller with a second interface, the controller connected to the non-volatile memory through the first interface and the second interface, wherein the controller comprises:
a controller memory configured to store instructions;
a task scheduler module within the controller; and
a processor connected to the controller memory,
the controller configured to:
determine multiple task queues based on one or more architectural aspects of the memory, the controller, or a combination thereof,
receive a plurality of tasks, each task comprising an instruction, a command, or a request from the access device,
assign a particular task of the plurality of tasks into one of the multiple task queues based upon a protocol type of the particular task,
select a first queue of the multiple task queues within the task scheduler module based on a selection scheme,
identify a first task to be processed from the first queue,
select a second queue of the multiple task queues based on the selection scheme, and
identify a second task to be processed from the second queue after the first task is identified,
wherein the multiple task queues comprises a plurality of protocol-based queues,
wherein the selection scheme comprises selecting based on a weight value, wherein the selection scheme further comprises alternating between the first queue and a set of queues, the set of queues comprising the second queue, a third queue, and a fourth queue, and wherein the selection scheme is cyclical with respect to the set of queues,
wherein the weight value is a number of tasks that may be concurrently executed or consecutively selected, and
wherein the one or more architectural aspects comprises a number of dies in the memory, a width of a data bus coupled to the memory and the controller, a size of a data buffer in the controller, or a combination thereof.

16. The data storage device, according to claim 15, wherein the non-volatile memory further comprises:
circuitry for conducting read operations and write operations.

17. The data storage device according to claim 16, wherein the task scheduler module further comprises:
a task assignment module connected to the controller memory, wherein the task assignment module is configured to assign tasks to the first queue and the set of queues.

18. The data storage device according to claim 17, wherein the task assignment module is further configured with a parse module.

19. The data storage device according to claim 15, wherein the controller further comprises:
an execution module configured to read one of the first task and the second task and execute the one of the first task and the second task.

20. The data storage device according to claim 15, wherein the controller further comprises:
a counter configured to indicate a number of tasks selected for execution.

* * * * *